(12) United States Patent
Ho et al.

(10) Patent No.: US 7,046,744 B2
(45) Date of Patent: May 16, 2006

(54) METHOD AND APPARATUS FOR FREQUENCY OFFSET ESTIMATION, AND SYSTEM UTILIZING SAME

(75) Inventors: Chin Keong Ho, Singapore (SG); Ping He, Singapore (SG); Sumei Sun, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 810 days.

(21) Appl. No.: 10/098,726

(22) Filed: Mar. 15, 2002

(65) Prior Publication Data

US 2003/0174790 A1    Sep. 18, 2003

(51) Int. Cl.
*H04L 27/06* (2006.01)

(52) U.S. Cl. ...................................... 375/340

(58) Field of Classification Search ................ 375/316, 375/340, 346
See application file for complete search history.

(56) References Cited

U.S. PATENT DOCUMENTS

| | | | |
|---|---|---|---|
| 6,104,238 A * | 8/2000 | Mattisson et al. | 329/319 |
| 6,901,121 B1 * | 5/2005 | Dubrovin et al. | 375/346 |
| 6,907,235 B1 * | 6/2005 | Lisenbee | 455/296 |
| 2001/0033601 A1 * | 10/2001 | Nafie et al. | 375/132 |

* cited by examiner

Primary Examiner—Kevin Burd
(74) Attorney, Agent, or Firm—Troutman Sanders LLP; Ryan A. Schneider, Esq

(57) ABSTRACT

A direct current (DC) offset estimation, frequency offset estimation, and compensation system (200), receives data packet (204) with preamble (206). A DC offset estimator (210) and a frequency offset estimator (212) operate concurrently to produce estimates of DC and frequency offsets of the data packet (204), which are determined from a portion of the preamble (206) as it is received. As the data packet (204) is received, a compensator (214) receives the estimates of DC and frequency offsets and compensates the remaining portion of the data packet (204) to produce a DC and frequency compensated data packet (218). Concurrent operation of the DC estimator (210) and the frequency offset estimator (212) advantageously allows more time to produce the estimates of DC and frequency offsets.

19 Claims, 17 Drawing Sheets

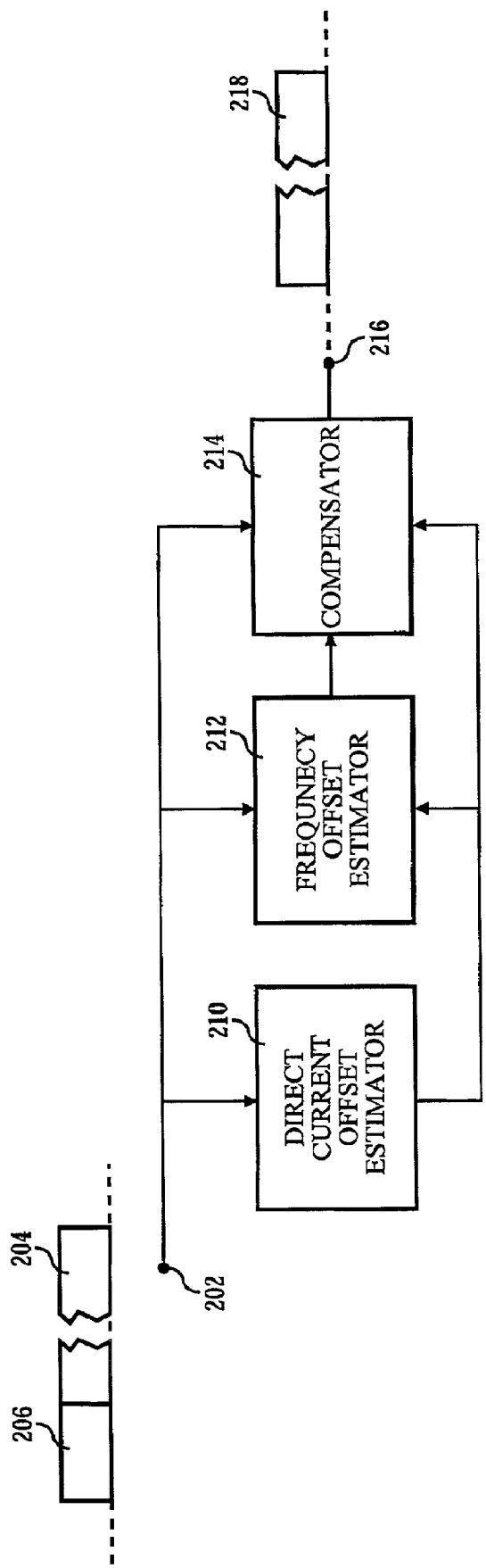

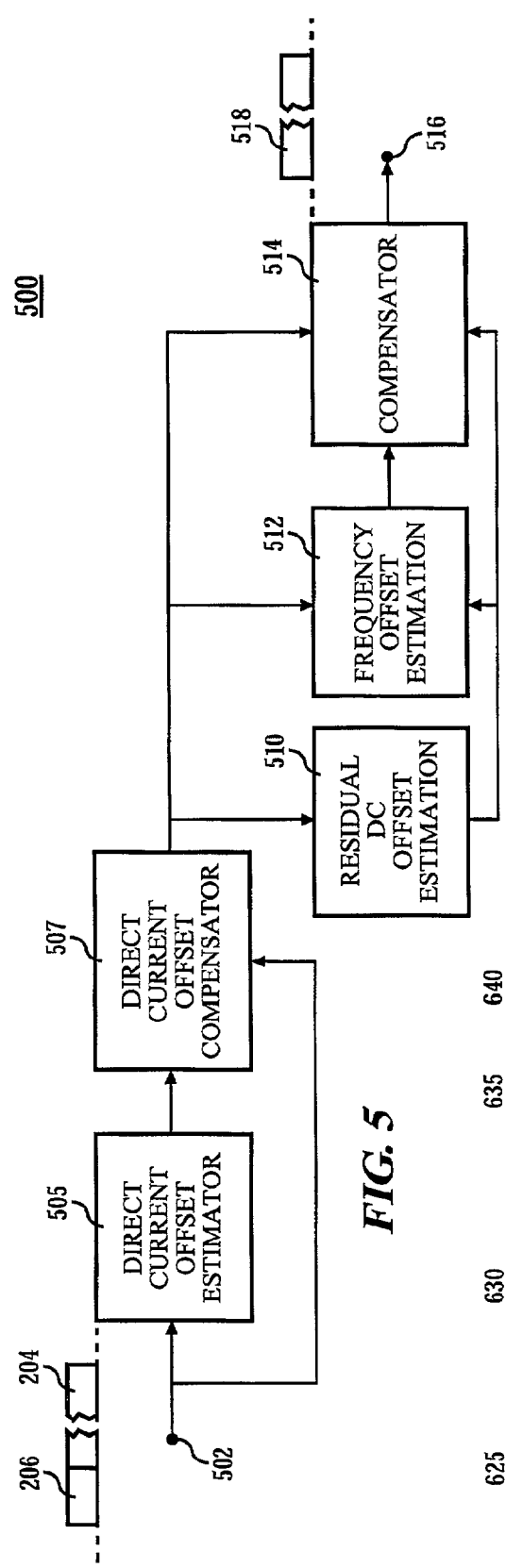
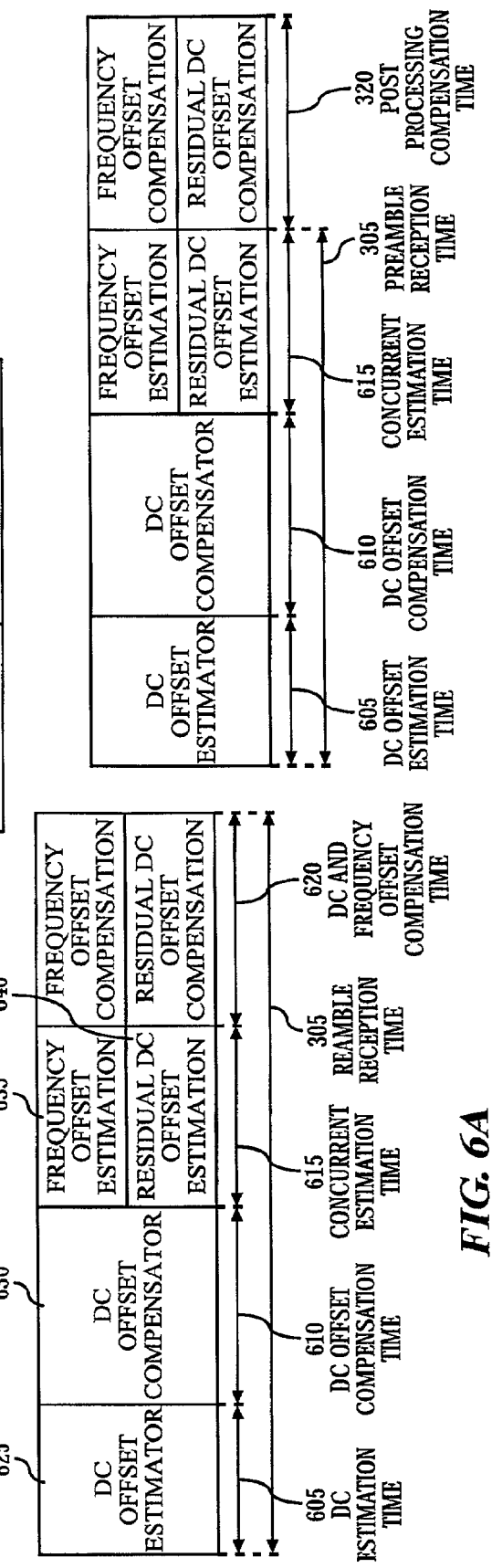

METHOD AND APPARATUS FOR FREQUENCY OFFSET ESTIMATION, AND SYSTEM UTILIZING SAME

FIELD OF THE INVENTION

The present invention relates to frequency offset estimation, and more particularly to frequency offset estimation in the presence of direct current offset.

BACKGROUND OF THE INVENTION

With the advent of personal wireless communication devices, there is a need for small portable units that have low power dissipation, and can be provided at relatively low cost. To meet these requirements, there is interest in a transceiver with direct conversion architecture (DCA). Different from conventional heterodyne receivers, the receiver of a DCA recovers base band information directly from the carrier signal without passing through an intermediate frequency stage and image signal rejection. This is accomplished by translating the radio frequency signal directly to zero frequency, and then employing a low pass filter to suppress any high frequency interference. The DCA receiver has several advantages over the heterodyne receiver, and meet the requirements of small form factor, low power dissipation, and low cost. However, a disadvantage is the down converted base band extends to zero frequency, and extraneous offset voltages, referred to as direct current (DC) offset, can corrupt the base band signal, and saturate subsequent base band processing stages. In addition, a DCA receiver also suffers I/Q mismatch, a result of mismatches between amplitude of the I and Q signal during quadrature down conversion. There are also concerns with even-order distortion, flicker noise and local oscillator leakage that adversely affect the performance of a DCA receiver.

Orthogonal frequency division multiplexing (OFDM) is a bandwidth efficient modulation technique that is used for high-speed wireless data transmissions. OFDM transmits data on densely packed orthogonal sub-carriers that are spaced in frequency exactly at the reciprocal of symbol interval. A primary advantage of OFDM is it is utilized for transmission at relatively low complexity in multipath channels. A disadvantage of OFDM systems is its sensitivity to frequency offset. Frequency offset can cause a reduction of signal amplitude at the output of OFDM demodulator, and also introduces inter-carrier interference (ICI) from the other sub-carriers, thus destroying the orthogonality of OFDM.

Combining the DCA and OFDM provides a transceiver that has a small form factor, has low power dissipation, is low cost and is bandwidth efficient. However, the DC offset and the frequency offset must be addressed. Typically, the approach that is taken is to estimate the DC and frequency offsets and then apply compensation based on the estimated offsets. In data transmission, offset estimation is typically performed during the reception of the preamble of each data packet, because in a packet switched system each data packet can be treated independently.

With reference to FIG. 1 a preamble 100 is shown with a time line t, where the preamble reception starts at t0, and ends at t3. During a first time interval t0 to t1 a first portion 105 of the preamble is used for DC offset estimation; during the second time interval t1 to t2 a second portion 110 of the preamble is used for DC offset compensation; and during a third time interval t2 to t3 a third portion 115 is used for frequency offset estimation. Here we assume that the receiver amplifier is not saturated by the presence of the DC offset. This conventional method sequentially estimates the DC offset, compensates for the DC offset, and then estimates the frequency offset. Of course it assumes that the DC offset estimation method is based on the initial reception of the first portions 105 of the preamble 100, and that the information from the first portion 105 is available.

Due to the limited time available to process the preamble 100, t0 to t1 interval for DC offset estimation, and t1 to t2 interval for DC offset compensation, one disadvantage is that residual DC offset may still be present when the frequency offset is later estimated in the time interval t2 to t3. Consequently, the residual DC may result in inaccurate frequency offset estimation. In addition, since part of the reception time of the preamble 100, interval t0 to t2, is used for DC offset estimation and compensation, the available time for frequency offset estimation, the interval t2 to t3, is reduced. Hence, a further disadvantage of this method is the short time during which frequency offset estimation is performed, and the consequent inaccuracy of the frequency offset estimation.

BRIEF SUMMARY OF THE INVENTION

The present invention seeks to provide a method and apparatus for offset estimation and system utilizing same, which overcomes or at least reduces the abovementioned problems of the prior art.

Accordingly, in one aspect, the present invention provides a data communication receiver for receiving at least one data packet, wherein the at least one data packet has a variety of inherent offsets, the data communication receiver comprising:

an input coupled to receive the at least one data packet; and a plurality of offset estimators coupled to the input, the plurality of offset estimators comprising:

at least one of the plurality of offset estimators for estimating at least one of the variety of inherent offsets from at least a received portion of the at least one data packet while the at least one data packet is being received, and the at least one of the plurality of offset estimators having an output for providing an estimate of the at least one of the variety of inherent offsets; and at least another one of the plurality of offset estimators coupled to the output of the at least one of the plurality of offset estimators, the at least another one of the plurality of offset estimators for estimating at least another one of the variety of inherent offsets from the at least the received portion of the at least one data packet while the at least one data packet is being received and from the estimate of the at least one of the variety of inherent offsets, and the at least another one of the plurality of offset estimators having an output for providing an estimate of the at least another one of the variety of inherent offsets.

In another aspect the present invention provides a data communication receiver for receiving data packets, the data communication receiver comprising:

an input coupled to receive at least one data packet, wherein the at least one data packet has a variety of inherent offsets;

at least one offset estimator for estimating at least one of the variety of inherent offsets from at least a received portion of the at least one data packet while the at least one data packet is being received, and the at least one offset estimator having an output for providing an estimate of the at least one of the variety of inherent offsets;

at least one compensator coupled to the input for receiving the at least one data packet, and coupled to the output of the at least one offset estimator for receiving the estimate of the at least one of the variety of inherent offsets, the at least one compensator for compensating the at least one of the variety of inherent offsets of the data packet using the estimate of the at least one of the variety of inherent offsets to produce at least a portion of a partially compensated data packet, and wherein the at least one compensator has an output for providing the at least the portion of the partially compensated data packet corresponding to the at least one data packet;

a plurality of offset estimators coupled to the output of the at least one compensator, the plurality of offset estimators comprising:

at least one of the plurality of offset estimators for estimating the at least one of the variety of inherent offsets from the at least the portion of the partially compensated data packet while the at least the portion of the partially compensated data packet is being received, and the at least one of the plurality of offset estimators having an output for providing an estimate of the at least one of the variety of inherent offsets; and at least another one of the plurality of offset estimators coupled to the output of the at least one of the plurality of offset estimators, the at least another one of the plurality of offset estimators for estimating at least another one of the variety of inherent offsets from the at least the portion of the partially compensated data packet while the at least the portion of the partially compensated data packet is being received, and from the estimate of the at least one of the variety of inherent offsets, and the at least another one of the plurality of offset estimators having an output for providing an estimate of the at least another one of the variety of inherent offsets.

In yet another aspect the present invention provides a method for offset compensation comprising the steps of:
a) determining at least one data packet is being received;
b) estimating direct current offset of the at least one data packet to produce an estimate of direct current offset;
c) estimating frequency offset of the at least one data packet using the estimate of direct current offset;
d) compensating the at least one data packet using the estimate of direct current offset and the estimate of frequency offset to produce a compensated data packet;
e) providing the compensated data packet corresponding to the at least one data packet.

In still another aspect the present invention provides a method for frequency offset estimation comprising the steps of:
a) determining samples of at least one data packet are being received;
b) determining direct current offset power using the samples of the at least one data packet;
c) adding a predetermined constant to the direct current offset power;
d) storing a predetermined number of the samples of the at least one data packet;
e) performing complex conjugation on the predetermined number of the samples to produce a result;
f) multiply the result of the complex conjugation with the samples of the at least one data packet to produce an output;
g) determine the average of the output from step (f) by another predetermined number to provide an average;

h) determine argument of the average and divide the argument by the negative value of the predetermined number to produce a resulting quotient; and
i) multiply the resulting quotient by the sum of the constant and the direct current offset power determined in step (c) to produce a frequency offset estimate.

In yet still another aspect the present invention provides a method for frequency offset estimation comprising the steps of:
a) determining samples of at least one data packet are being received;
b) determining direct current offset power using the samples of the at least one data packet;
c) storing a predetermined number of the samples of the at least one data packet;
d) performing complex conjugation on the predetermined number of the samples to produce a result;
e) multiply the result of the complex conjugation with the samples of the at least one data packet to produce an output;
f) determine the average of the output from step (e) by another predetermined number to provide an average;
g) combine the direct current offset power from step (b) with the average from step (f) by subtraction;
h) determine argument of the result of subtraction from step (g) and divide the argument by the negative value of the predetermined number to produce a frequency offset estimate.

BRIEF DESCRIPTION OF THE DRAWINGS

An embodiment of the present invention will now be more fully described, by way of example, with reference to the drawings of which:

FIG. 2 shows a functional block diagram of one embodiment of an offset estimation and compensation system in accordance with the present invention;

FIG. 5 shows a functional block diagram of another embodiment of an offset estimation and compensation system in accordance with the present invention;

FIG. 6A shows a time-activity diagram of the offset estimation and compensation system in FIG. 5;

FIG. 6B shows an alternate time-activity diagram of the offset estimation and compensation system in FIG. 5;

DETAIL DESCRIPTION OF THE DRAWINGS

Figure 1:
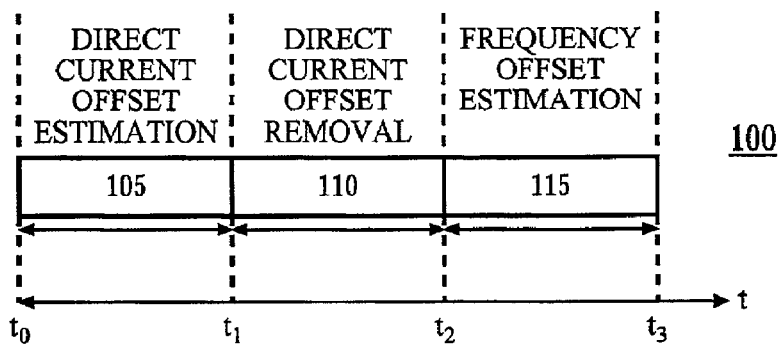
FIG. 1 shows a time-activity diagram of a prior art offset estimation and compensation system.

A direct current (DC) and frequency offset estimation and compensation system receives data packets, each having a preamble. The system comprises a DC offset estimator and a frequency offset estimator that operate concurrently to produce estimates of DC and frequency offsets of the data packet, which are determined from a portion of the preamble as it is received. As the rest of the preamble is received, or alternatively after the preamble is received, a compensator receives the estimates of DC and frequency offsets and compensates the remaining portion of the data packet to produce a DC and frequency offset compensated data packet.

The concurrent operation of the DC and the frequency offset compensators advantageously allows more time to produce the estimates of DC and frequency offsets.

The frequency offset compensator disclosed advantageously receives the estimate of the DC offset from the DC estimator and uses the estimate of the DC offset to produce the estimate of the frequency offset, thus providing an improved estimate of the frequency offset.

With reference to FIG. 2 one embodiment of a DC and frequency offset estimation and compensation system 200 comprises an input 202 for receiving data packets 204 having a preamble 206. The input 202 is coupled to a DC offset estimator 210, a frequency offset estimator 212, and a compensator 214, and as the preamble 206 is received, it is provided concurrently to a DC offset estimator 210, a frequency offset estimator 212, and a compensator 214. The DC offset estimator 210 produces an estimate of DC offset and is coupled to provide the estimate to both the frequency offset estimator 212 and the compensator 214. The frequency offset estimator 212 uses the estimate of DC offset and is coupled to provide an estimate of frequency offset to the compensator 214. The compensator 214 receives estimates of both the DC and frequency offsets, and is coupled to an output 216, which provides a corresponding DC and frequency compensated data packet 218.

Figure 3A:
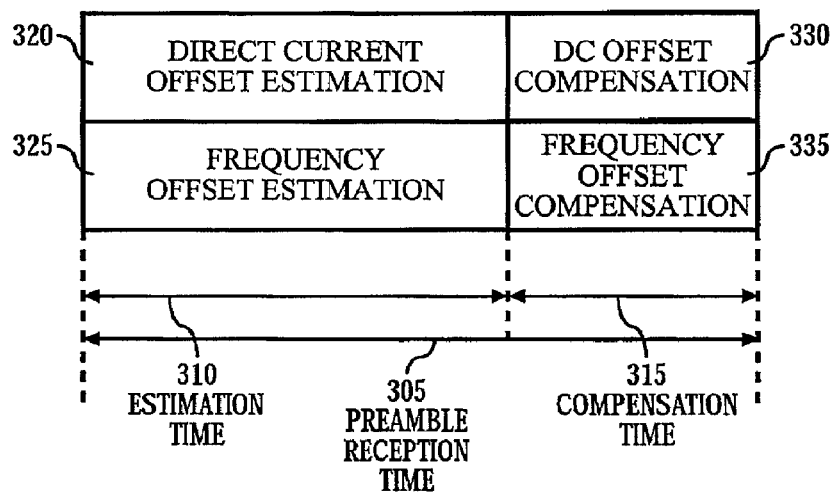
FIG. 3A shows a time-activity diagram of the offset estimation and compensation system in FIG. 2.

The system 200 performs concurrent estimation of the DC and frequency offsets when the preamble 206 is being received. With reference to FIG. 3A, this provides the opportunity for compensation to also be performed during reception of the preamble 206. Preamble reception time 305 is the time during which the preamble 206 of the data packet 204 is received. The preamble time 305 can be divided into a first portion, which will be referred to as estimation time 310, and a second portion, which will be referred to as compensation time 315. During the estimation time 310, the DC offset estimator 210 and the frequency offset estimator 212 operate concurrently, as shown by the blocks 320 and 332. Then, during the compensation time 315, the compensator 214 operates as shown by blocks 330 and 335 to compensate the received preamble 206 of the data packet 204 for both DC and frequency offsets, and can begin to provide the compensated data packet 218 by the end of the preamble reception time 305.

Figure 3B:
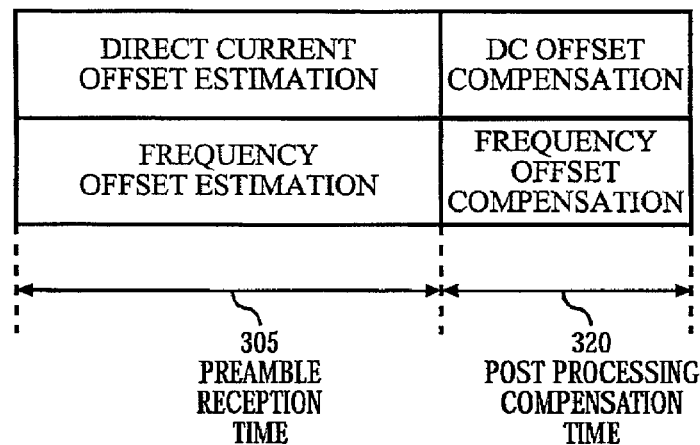
FIG. 3B shows an alternate time-activity diagram of the offset estimation and compensation system in FIG. 2.

Alternatively, with reference to FIG. 3B, the DC and frequency offset estimation can be performed during the preamble reception time 305, and the DC and frequency offset compensation can be performed later i.e. after the preamble reception time 305, during a post processing compensation time 320. Of course this approach necessitates the use of a buffer to store the received data packet 204, and subsequently apply the post processing compensation to the stored data packet.

Figure 4:
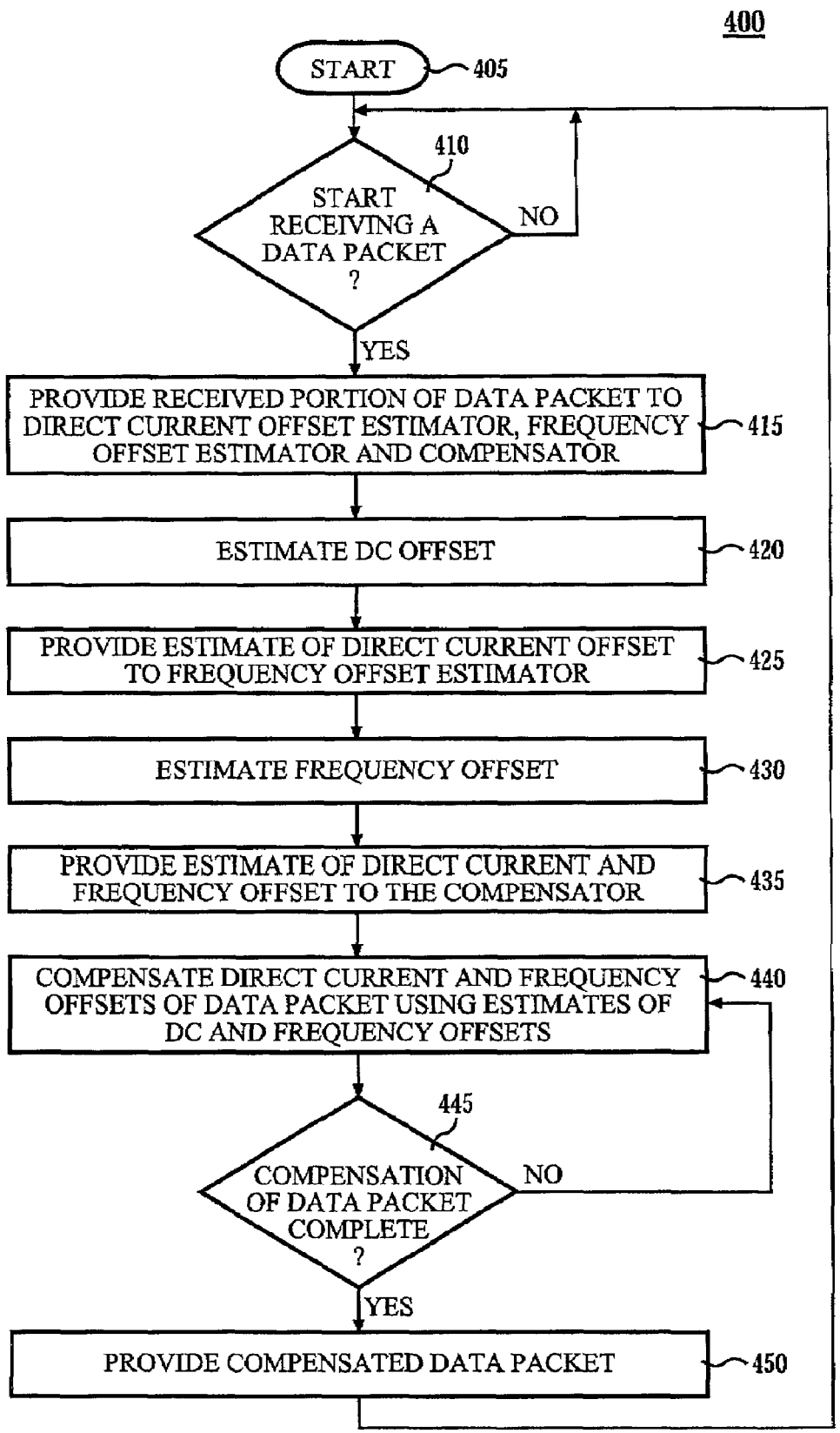
FIG. 4 is a flowchart detailing the operation of the offset estimation and compensation system in FIG. 2.

With reference now to FIG. 4, the operation 400 of the system 200 starts 405 with determining 410 when reception of the data packet 204 has started, and when the determination is positive, providing 415 the received portion of the data packet 204 to the DC offset estimator 210, the frequency offset estimator 212, and the compensator 214.

The DC offset estimator 210 estimates 420 DC offset of the data packet 204 from a part of the preamble 206, and provides 425 an estimate of the DC offset to the frequency offset estimator 212. The frequency offset estimator 212 uses the estimate of DC offset to estimate 430 frequency offset of the data packet 204, and produces an estimate of the frequency offset.

The compensator 214 is provided 435 with the estimates of the DC offset and the frequency offset, and the compensator 214 uses the DC and frequency offsets to compensate 440 the data packet 204. Here, compensation is performed as the data packet is received, and the compensator 214 continues to compensate 440 the data packet 204 until a determination 445 is made that the compensation of the data packet 204 is complete, and the compensated data packet 218 has been provided 450. The operation 400 then returns to determining 410 the start of reception of another data packet.

With reference to FIG. 5 another embodiment of a DC and frequency offset estimation and compensation system 500 comprises an input 502 for receiving data packets 204 having a preamble 206. The input 502 is coupled to a DC offset estimator 505 and a DC offset compensator 507. The DC offset estimator 505 produces an estimate of DC offset from a portion of the preamble 206 as it is received, and has an output that is coupled to provide the estimate to the DC offset compensator 507. The DC offset compensator 507 uses the estimate of DC offset and the data packet 204 to produce a portion of a DC offset compensated preamble (not shown).

The DC offset compensator 507 has an output which is coupled to provide the portion of the DC offset compensated preamble concurrently to a residual DC offset estimator 510, a frequency offset estimator 512, and a compensator 514. As the portion of the DC offset compensated preamble is received, it is provided concurrently to a residual DC offset estimator 510, a frequency offset estimator 512, and a compensator 514. The residual DC offset estimator 510 produces an estimate of residual DC offset and is coupled to provide the estimate to both the frequency offset estimator 512 and the compensator 514. The frequency offset estimator 512 uses the estimate of residual DC offset, and is coupled, to provide an estimate of frequency offset to the compensator 514. The compensator 514 receives estimates of both the residual DC and frequency offsets, and is coupled to an output 516, which provides a corresponding residual DC and frequency compensated data packet 518.

The system 500 performs sequential DC offset estimation and compensation followed by concurrent estimation of residual DC and frequency offsets when the preamble 206 is being received. With reference to FIG. 6A, this provides the opportunity for further offset compensation to be performed during reception of the preamble 206. As before, the preamble reception time 305 is the time during which the preamble of the data packet 204 is received. The preamble time 305 can be divided into a first portion, which will be referred to as estimation time 605, a second portion, which will be referred to as DC offset compensation time 610, a third portion, which will be referred to as concurrent compensation time 615, and a fourth portion, which will be referred to as DC and frequency offset compensation time 610. During the estimation time 605, only the DC offset estimator 505 operates as shown by the block 625, and during the DC offset compensation time 610 only the DC offset compensator 507 operates as shown by block 630. However, during the concurrent estimation time 615 both the residual DC offset estimator 510 and the frequency offset estimator 512 operate, as shown by blocks 635 and 640. Finally, during the DC and frequency offset compensation time 620, the compensator 514 compensates the portion of the DC offset compensated preamble, and can begin to provide the compensated data packet 518 by the end of the preamble reception time 305.

Alternatively, with reference to FIG. 6B, the DC estimation and compensation, and the concurrent estimation of DC and frequency offsets can be performed during the preamble reception time 305, and the residual DC and frequency offset compensation can be performed later i.e. after the preamble reception time 305, during a post processing compensation time 320. As before, this approach necessitates the use of a buffer to store the received data packet 204, and subsequently apply the post processing compensation to the stored data packet.

Figure 7:
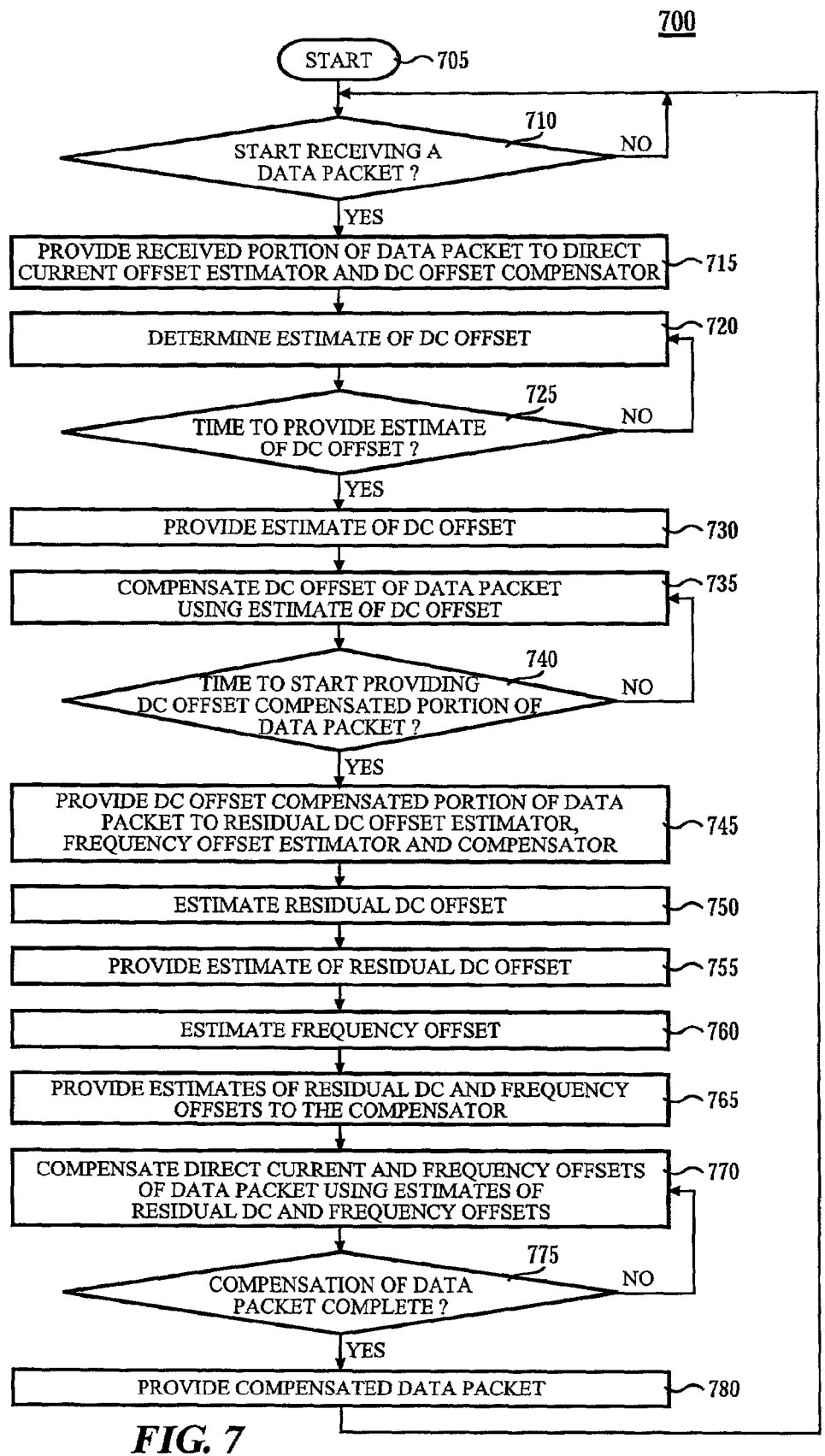
FIG. 7 is a flowchart detailing the operation of the offset estimation and compensation system in FIG. 5.

With reference now to FIG. 7, the operation 700 of the system 500 starts 705 with determining 710 when reception of the data packet 204 has started, and when the determination is positive, providing 715 the received portion of the data packet 204 to the DC offset estimator 505 and the DC offset compensator 507. The DC offset estimator 507 determines 720 an estimate of DC offset of the data packet 204 from the received portion of the data packet 204, and when a determination 725 is made that a predetermined estimation time 605 has elapsed, then the DC offset estimator 507 provides 730 an estimate of the DC offset to the DC offset compensator 507. The DC offset compensator 507 uses the estimate of DC offset and the received portion of the data packet 204 to compensate the received portion of the data packet, and subsequently produce a DC offset compensated portion of the data packet 204 after a determination 740 that the DC offset compensation time 610 has elapsed.

The DC offset compensated portion of the data packet 204 is then concurrently provided 745 to the residual DC offset estimator 510, the frequency offset estimator 512, and the compensator 514. The residual DC offset estimator 210 estimates 750 residual DC offset of the compensated portion of the data packet 204, and provides 755 an estimate of the residual DC offset to the frequency offset estimator 512. The frequency offset estimator 512 uses the estimate of the residual DC offset to estimate 760 frequency offset of the compensated portion of the data packet 204, and produces an estimate of the frequency offset.

The compensator 514 is provided 765 with the estimates of the residual DC offset and the frequency offset, and the compensator 214 uses the residual DC and frequency offsets to further compensate 770 the compensated portion of the data packet 204. Again, compensation is performed as the data packet 204 is received, and the compensator 514 continues to compensate 770 the data packet 204 until a determination 445 is made that the further compensation of the data packet 204 is complete, and the compensated data packet 518 has been provided 780. The operation 700 then returns to determining 710 the start of reception of another data packet.

The frequency offset estimator 212 and 512, in accordance with the present invention, will now be described based on a DCA receiver with OFDM modulation.

As an illustrative aid, a model is provided with the following notation:

$f_c$ is inter-carrier spacing of OFDM sub-carriers;
$f_a$ is actual frequency offset of OFDM sub-carriers;
$\epsilon$ is the relative frequency offset i.e. the ratio of $f_a$ to $f_c$;
P is the number of sub-carriers used; and
$T=1/(Pf_c)$ as the sampling interval.

Figure 8:
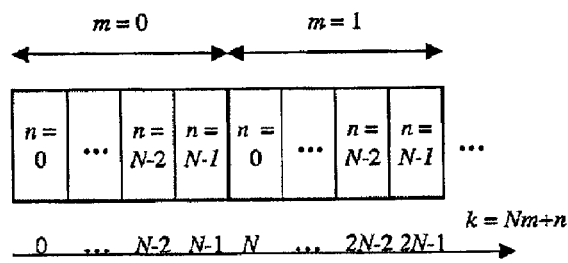
FIG. 8 shows the structure of a preamble of a data packet.

FIG. 8 shows the structure of the preamble of data packets that will be used in a simulation with the model, where the preamble complies with the IEEE 802.11a standard. The preamble comprises M slots each having an inter-slot index m, and N intra-slots each having an intra-slot index n. The model will be used in a simulation, with P=64 and N=16 on a communication channel.

A transmitted preamble can be defined as $$x(m,n) \triangleq |x(m,n)| \exp(j\alpha(m,n)) \quad (1)$$

The complex channel gain as:

$$A \triangleq |A| \exp(j\theta) \quad (2)$$

And, as a result of the DCA, the DC offset as:

$$\delta \triangleq |\delta| \exp(j\beta) \quad (3)$$

The assumption that a time invariant complex gain A and DC offset $\delta$ is valid, when the coherence time is relatively large as compared to the packet length, and when the gain controller at the receiver is held constant.

The preamble is transmitted via a communication channel with a frequency offset defined as follows:

$$\gamma = \frac{2\pi f_a}{(Pf_c)} = \frac{2\pi\varepsilon}{(P)}$$

Figure 9:
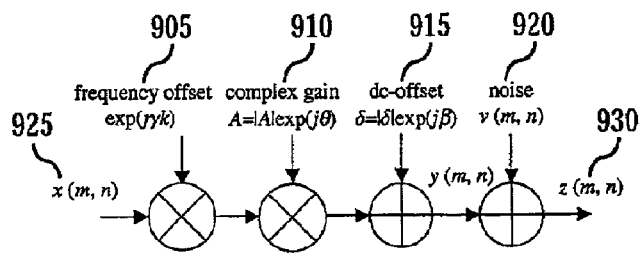
FIG. 9 is a model of a communication channel on which data packets having the preamble in FIG. 8 are transmitted.

With reference to FIG. 9 the model 900 of the communication channel takes into account the various parameters of the communication channel that affect transmission of data packets. These include frequency offset 905 represented by $\exp(j\gamma k)$, complex gain 910 represented by $A=|A|\exp(j\theta)$, direct current offset 915 represented by $\delta=|\delta|\exp(j\beta)$, and noise 920 represented by v(m,n), which affect the transmitted preamble 925 represented by x(m,n) and results in a received preamble 930 represented by z(m,n). Further, including additive white Gaussian noise (AWGN) in the communication channel with variance $\sigma_v^2$, the received preamble 930 is defined as follows:

$$z(m, n) = y(m, n) + v(m, n) \quad (4)$$

-continued $$y(m, n) = Ax(m, n)\exp(j\gamma k) + \delta \qquad (5)$$
$$= |Ax(m, n)|\exp[j(\gamma k + \alpha(m, n) + \theta] + |\delta|\exp(j\beta)$$

Prior Art With no DC Offset

An article titled "Frequency Offset Synchronization and Channel Estimation for OFDM Based Transmission" by Song et al. in IEEE Communications Letters Vol. 4 No. 3 March 2000, discloses frequency offset estimation for a communication channel in the presence of AWGN, and where there is no DC offset. The article teaches that when the signal to noise ratio (SNR) is high, the frequency offset estimator is not biased.

This may be expressed, thus.

$$E[\hat{\epsilon}]-\epsilon=0$$

Then, the variance of the frequency offset estimator can be shown as follows:

$$E\{[\hat{\epsilon} - E[\hat{\epsilon}]]^2\} \approx \left(\frac{P}{N2\pi}\right)^2 \frac{1}{(M-1)^2 N \ SNR} \triangleq \sigma^2(M, N) \qquad (6)$$

For unbiased estimators, the variance of the estimator is the mean square error (MSE) of the estimate.

Another article titled "A Technique for Orthogonal Frequency Division Multiplexing Frequency Offset Correction" by Moose in IEEE Transactions on Communications Vol. 42 No. 10 October 1994, discloses a maximum likelihood estimation algorithm. Using Moose's algorithm, the M repeated slots each with a length of N points is divided into two bigger slots, each of length MN/2, on the assumption that M is even. The variance of frequency offset estimate can then be obtained by replacing M by 2 and N by MN/2 in equation (6), producing the following equation.

$$\sigma^2(2, MN/2) \approx \left(\frac{P}{MN\pi}\right)^2 \frac{1}{MN \ SNR/2} \qquad (7)$$

Then assuming M is even we have:

$$\frac{\sigma^2(2, MN/2)}{\sigma^2(M, N)} = \frac{8(M-1^2)}{M^3} = \begin{cases} 1, & M = 2 \\ >1, & M = 4 \\ <1, & M = 6, 8 \ldots \end{cases}$$

From the equation above, Moose's frequency offset estimator provides better performance than Song's in the way of lower variance for M=6, 8, . . . etc. In addition, the improvement is marginal for smaller values of M. However, neither Moose nor Song considers a frequency offset estimator that takes into account the presence of a DC offset.

Prior Art With DC Offset

Now using the frequency offset estimator above with DC offset and equation (20), which will be derived later, the mean square error (MSE) of the frequency offset estimate, taking into account the DC offset, can be determined as follows:

$$E\{[\hat{\epsilon} - \epsilon]^2\} = E\{[\hat{\epsilon} - E(\hat{\epsilon}) + E(\hat{\epsilon}) - \epsilon]^2\} \qquad (8)$$
$$= E\{[\hat{\epsilon} - E(\hat{\epsilon})]^2\} + E\{[E(\hat{\epsilon}) - \epsilon]^2\}$$
$$= E\{[\hat{\epsilon} - E(\hat{\epsilon})]^2\} + [E(\hat{\epsilon}) - \epsilon]^2$$

This relates the MSE to the variance and bias of the estimator. When DC offset is present, the estimator is biased:

$$E[\hat{\epsilon}] - \epsilon = -\frac{P}{2\pi N}\arg(1 + |\delta|^2\exp(jN\gamma)) \qquad (9)$$

Thus, with the variance given in Equation (6), and if proper preamble is used, the MSE can be approximated as follows:

$$E[(\epsilon - \hat{\epsilon})^2] \approx \sigma^2(M, N) + \left[\frac{P}{2\pi N}\arg(1 + |\delta|^2\exp(jN\gamma))\right]^2 \qquad (10)$$

Figure 10:
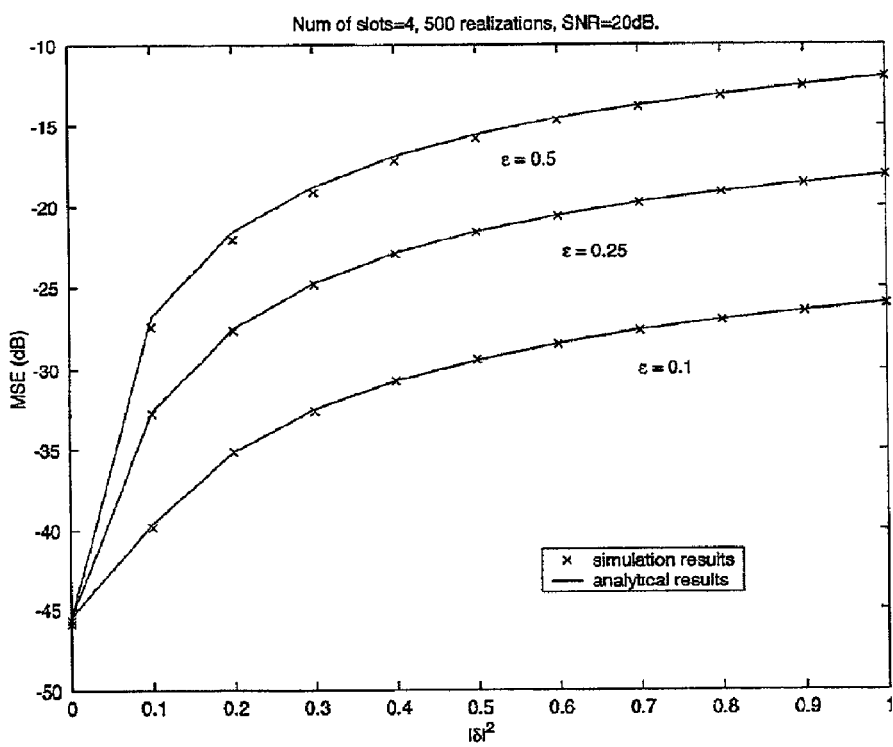
FIG. 10 provides a graph showing the deterioration in frequency offset estimates with increasing DC offset power.

The accuracy of the result is validated by comparing equation (10) with the MSE of frequency offset estimates obtained from simulations for different values of $\epsilon$ and $|\delta|^2$ using M=4 at SNR=20 dB. With reference to FIG. 10, the MSE is normalized to $\epsilon$ and is consistent with the analytical expression. It can also be observed that the frequency offset estimate is sensitive to the presence of DC offset.

Derivation of Equation (20)

Song's frequency offset estimator assumed the communication channel to be noisy and averages over a number of terms to improve the estimation. However, here an expression for the frequency offset estimation is first derived assuming that the channel is noiseless and no averaging is carried out.

Figure 11:
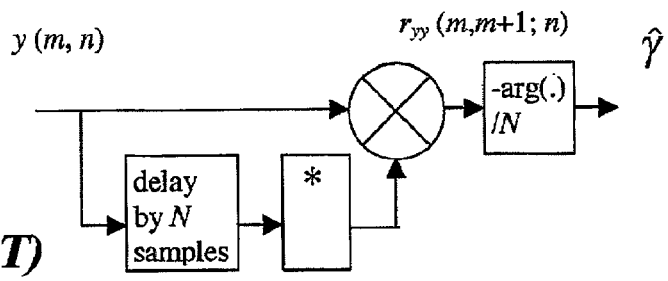
FIG. 11 shows a functional block diagram of a prior art frequency offset estimator without averaging.

With reference to FIG. 11, which illustrates a frequency offset estimator based on $r_{yy}(m,m+1;n)$, where $r_{yy}(m,m+1;n)$ is defined as the multiplication of discrete point y(m,n) with its conjugate N samples or the equivalent of one slot apart in time. Hence, $$r_{yy}(m, m + 1; n) = y(m, n)y^*(m + 1, n) \qquad (11)$$
$$= |Ax(m, n)|^2\exp(-jN\gamma) + |\delta|^2 +$$
$$|A\delta x(m, n)|\{\exp(j\xi(m, n)) +$$
$$\exp(-j\xi(m + 1, n))\}$$
$$= |Ax(m, n)|^2\exp(-jN\gamma) + |\delta|^2 +$$
$$|A\delta x(m, n)|\exp(j\xi(m, n))\{1 +$$
$$\exp[-j(\xi(m + 1, n) + \xi(m, n))]\},$$

where $\xi(m,n) \triangleq \gamma \cdot (Nm+n)+\alpha(m,n)+\theta-\beta$. $\qquad (12)$ Note that $\xi(m+1,n)+\xi(m,n)=2\xi(m,n)+N\gamma$, and using the identity $1+\exp(j2\theta) \equiv 2\cos(\theta)\exp(j\theta)$, the last term of equation (11) can be written as follows:

$$|A\delta x(m,n)|\exp(j\xi(m,n))\{1+\exp[-j(2\xi(m,n)+N\gamma)]\}=|A\delta x(m,n)| \cdot 2\cos(\xi(m,n)+N\gamma/2) \cdot \exp(-jN\gamma/2) \qquad (13)$$

Now substituting equation (13) in equation (11) and taking out the factor exp(−jNγ) the following equation is obtained.

$$r_{YY}(m,m+1;n) = \exp(-jN\gamma)[|Ax(m,n)|^2 + |\delta|^2 \exp(jN\gamma) + \phi_{m,n}\exp(jN\gamma/2)]\text{tm} \quad (14)$$

where $\phi(m,n) \triangleq 2|A\delta x(m,n)|\cos(\xi(m,n)+N\gamma/2)$. (15)

Estimating the frequency offset using one point, when $\delta=0, \phi(m,n)=0$, and the phase of $r_{yy}(m,m+1;n)$ is $-N\gamma$, assuming $|N\gamma|<\pi$, the frequency offset γ under noiseless conditions can be obtained by dividing the phase by −N. This is Song's frequency offset estimator with the assumption that no averaging is performed.

When DC offset is present, $\delta \neq 0$, the frequency offset estimate then becomes:

$$\hat{\gamma} = -\frac{1}{N}\arg[r_{yy}(m, m+1; n)] \quad (16)$$

$$= \gamma - \frac{1}{N}\arg[|Ax(m, n)|^2 +$$

$$|\delta|^2 \exp(jN\gamma) + \phi(m, n)\exp(jN\gamma/2)]$$

$$= \gamma - \frac{1}{N}\arg\left[1 + \frac{|\delta|^2}{|Ax(m,n)|^2}\exp(jN\gamma) +\right.$$

$$\left.\frac{\phi(m,n)}{|Ax(m,n)|^2}\exp(jN\gamma/2)\right].$$

The last two terms in the argument are undesirable and cause errors in the frequency offset estimate $\hat{\gamma}$. While the first undesirable term can be used for estimation if $|\delta|^2$ is known, the second undesirable term is difficult to determine in practice.

Based on the model with Song's frequency offset estimator, where here the communication channel is assumed to be noiseless, and now with averaging to isolate the undesirable term, an alternate expression for the frequency offset estimation is now derived.

Figure 12:
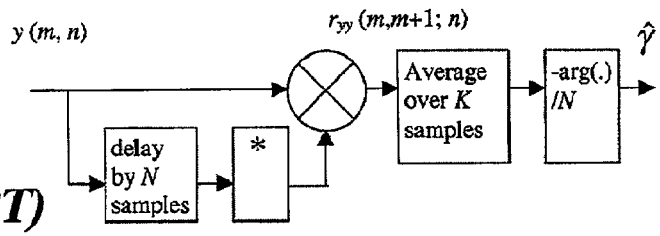
FIG. 12 shows a functional block diagram of another prior art frequency offset estimator when averaging is employed.

With reference to FIG. 12, which illustrates another frequency offset estimator based on averaging of $r_{yy}(m,m+1;n)$, the time average of $r_{yy}(m,m+1;n)$ is defined as $R_{yy}(m,m+1;n)$. To simplify analysis, and for the substitution x(m, n)=x(0,n) to be valid in the summation, consideration is only accorded to the case when N(M−1) terms are used for the averaging over equation (15), thus:

$$R_{yy}(m, m+1; n) = \frac{1}{N(M-1)}\sum_{m=0}^{M-2}\sum_{n=0}^{N-1} r_{yy}(m, m+1; n) \quad (17)$$

$$= \exp(-jN\gamma)\left[\frac{1}{N}\sum_{n=0}^{N-1}|Ax(0,n)|^2 + |\delta|^2\exp(jN\gamma) + \frac{1}{N(M-1)}\sum_{m=0}^{M-2}\sum_{n=0}^{N-1}\phi(m,n)\exp(jN\gamma/2)\right]$$

$$= \exp(-jN\gamma)[1 + |\delta|^2 \exp(jN\gamma) + \Psi(M, N, \gamma)]$$

where the undesirable term that is difficult to estimate, using equations (12) and (15) is given as:

$$\Psi(M, N, \gamma) \triangleq \frac{\exp(jN\gamma/2)}{N(M-1)}\sum_{m=0}^{M-2}\sum_{n=0}^{N-1}\phi(m,n) = \frac{2|A\delta|\exp(jN\gamma/2)}{N(M-1)} \quad (18)$$

$$\sum_{m=0}^{M-2}\sum_{n}^{N-1}|x(0,n)|\cos(\gamma \cdot (Nm+n) + \alpha(0,n) + \theta - \beta + N\gamma/2).$$

We normalized the power of the received preamble when DC offset and noise is absent as 1, i.e.

$$\frac{1}{N}\sum_{n=0}^{N-1}|Ax(0,n)|^2 = 1 \quad (19)$$

The implications are that $|A|$ is assumed to be known, and more importantly, that the values $|\delta|^2$ and $\Psi(M,N,\gamma)$ are normalized to the received preamble power. In the absence of DC offset, the frequency offset estimate, which is valid for $|N\gamma| \leq \pi$ assuming that $\arg[1+|\delta|^2 \exp(jN\gamma+\Psi(M,N,\gamma))] << N\gamma$ is, $$\hat{\gamma} = -\frac{1}{N}\arg[R_{yy}(m, m+1; n)] \quad (20)$$

$$= \gamma - \frac{1}{N}\arg[1 + |\delta|^2 \exp(jN\gamma) + \Psi(M, N, \gamma)].$$

As in equation (16), the last two terms in the argument cause errors in the frequency offset estimate even in the absence of noise. However, assuming $|\delta|$ is known, and if $\Psi(M,N,\gamma)<<1$, a more simplified expression can be obtained for $\hat{\gamma}$, the frequency offset estimate.

Validity of $\Psi(M,N,\gamma)<<1$

Support for the assumption that $\Psi(M,N,\gamma)<<1$ now follows, with determining the conditions that need to be satisfied for the assumption to hold true when ψ $\triangleq \theta-\beta+N\gamma/2\epsilon[0,2\pi)$ varies for different data packets. A method is proposed to design the preamble of the data packets such that the assumption is valid for small values of γ but for different ψ, since in practice this is an unknown value. Three conditions, Condition A, Condition B, and Condition C, are deduced which lead to increasing support as to the validity of $\Psi(M,N,\gamma)<<1$ when γ is small. In particular it will be shown that the preamble that conforms to the standards of IEEE 802.11a satisfies the Condition A.

For simplification, equation (18) is re-written as follows:

$$\Psi(M,N,\gamma,\psi) = 2|A\delta|\Psi'(M,N,\gamma,\psi) \tag{21}$$

where $$\Psi'(M, N, \gamma, \varphi) \triangleq \tag{22}$$

$$\frac{\exp(jN\gamma/2)}{(M-1)N} \sum_{n=0}^{N-1} |x(0, n)| \sum_{m=0}^{M-2} \cos(\gamma N m + \gamma n + \alpha(0, n) + \psi)$$

Using the identity $\sum_{k=0}^{n-1} \cos(kx + a) \equiv$ $$\cosec\frac{x}{2}\sin\left(\frac{nx}{2}\right)\cos\left(\frac{(n-1)x}{2} + a\right)$$

for the summation over index m, equation (22) becomes, $$\Psi'(M, N, \gamma, \psi) = \tag{23}$$

$$\frac{\exp(jN\gamma/2)}{M-1}\cosec\left(\frac{\gamma N}{2}\right)\sin\left(\frac{(M-1)\gamma N}{2}\right)\Psi''(N, \gamma, \psi')$$

where $$\Psi''(N, \gamma, \psi') \triangleq \frac{1}{N}\sum_{n=0}^{N-1} |x(0, n)|\cos(\gamma n + \alpha(0, n) + \psi') \tag{24}$$

$$\psi' \triangleq \psi + \gamma N(M-2)/2 \in [0, 2\pi) \tag{25}$$

A more useful expression of equation (24) for observing the conditions when $\Psi''(N,\gamma,\psi')$ can be made small by some choice of is $x(0,n)$ is given as follows:

$$\Psi''(N, \gamma, \psi') = \frac{1}{N}\Re\left[\sum_{n=0}^{N-1} |x(0, n)|\exp(j\gamma n)\exp j\alpha(0, n))\exp(j\psi')\right] \tag{26}$$

$$= \frac{1}{N}\Re\left[\exp(j\psi')\sum_{n=0}^{N-1} x(0, n)\exp(j\gamma n)\right]$$

Summarizing, the following equation results.

$$\Psi(M, N, \gamma, \psi) = 2|A\delta|\overbrace{\frac{\exp(jN\gamma/2)}{M-1}\cosec\left(\frac{\gamma N}{2}\right)\sin\left(\frac{M\gamma N}{2}\right)\underbrace{\frac{1}{N}\Re\left[\exp(j\psi')\sum_{n=0}^{N-1} x(0, n)\exp(j\gamma n)\right]}_{\Psi''(N,\gamma,\psi')}}^{\Psi'(M,N,\gamma,\psi)} \tag{27}$$

A. Bound and Statistical Analysis of $\Psi''(N,\gamma,\psi')$

For each preamble received, all the parameters and signal at a given (m,n) can be considered to be fixed. However, when the next data packet is received, we have a new set of parameters and signal. The bound of $\Psi''(N,\gamma,\psi')$ will now be calculated for any given $\psi'\in[0,2\pi)$ and $\gamma\in[-\pi/N,\pi/N)$. Then assuming $\psi'$ to be a random variable, the mean and variance of $\Psi''(N,\gamma,\psi')$ is analyzed.

Using equation (26) and that in general for any value of $\theta$, $$|\Re R[\exp(j\theta)(a+jb)]| = |\cos(\theta)a - \sin(\theta)b| = |a+jb|\cdot|\cos(\theta+a\tan(b/a))| \tag{28}$$

the bound of $\Psi''(N,\gamma,\psi')$ can be expressed as follows:

$$|\Psi''(N, \gamma, \psi')| \leq \frac{1}{N}\left|\sum_{n=0}^{N-1} x(0, n)\exp(j\gamma n)\right| \triangleq \max_{\psi'}|\Psi''(N, \gamma, \psi')| \tag{29}$$

Assuming that $\psi'$ is a random variable with uniform distribution, with the probability density function (pdf) given as $$\frac{1}{2\pi} \text{ for } [0, 2\pi),$$

the mean of $\Psi''(N,\gamma,\psi')$ is, $$E_{\psi'}[\Psi''(\psi')] = \frac{1}{N}\int_0^{2\pi}\Psi''(\psi')\cdot\frac{1}{2\pi}d\psi' \tag{30}$$

$$= \frac{1}{N}\frac{1}{2\pi}\Re\left[\sum_{n=0}^{N-1} x(0, n)\exp(j\gamma n)\int_0^{2\pi}\exp(j\psi')d\psi'\right]$$

$$= 0$$

The variance can be obtained using equation (28) as follows:

$$\text{var}[\Psi''(\psi')] = \int_0^{2\pi} |\Psi''(\psi')|^2 \frac{1}{2\pi}d\psi' \tag{31}$$

$$= \frac{1}{2N^2}\left|\sum_{n=0}^{N-1} x(0, n)\exp(j\gamma n)\right|^2$$

$$= \frac{1}{2}\left[\max_{\psi'}|\Psi''(N, \gamma, \psi')|\right]^2$$

Thus, the above relates the bound of $|\Psi''|$ and the variance of $\Psi''$ with respect to $\psi'$. Therefore, if $\max_{\psi'}|\Psi''(N,\gamma,\psi')|$ can be made close to 0, the assumption that $\Psi(M,N,\gamma,\psi)<<1$ is valid. This is true when $M\to\infty$ for any given $\delta$ and $\psi'$, but not necessarily true when $N\to\infty$. Typically, not many slots will be available for averaging, so a preamble is designed such that it has a small bound. This can be done by scrutinizing the function $\max_{\psi'}|\Psi''(N,\gamma,\psi')|$.

B. Condition A

When $\gamma n \ll 1$ for $n=0,\ldots,N-1$, then it can be written that $\exp(j\gamma n) \approx 1, n=0,\ldots,N-1$. Then from equation (29), $$\max|\Psi''(N,\gamma)| \approx \frac{1}{N}\left|\sum_{n=0}^{N-1} x(0,n)\right|. \qquad (32)$$

For $\Psi(M,N,\gamma,\psi) \ll 1$, the Condition A is defined as follows:

$$\sum_{n=0}^{N-1} x(0,n) = 0. \qquad (33)$$

C. Condition B

Now assuming that N is even, an alternative expression for equation (29) is:

$$\max_{\psi'}|\Psi''(N,\gamma,\psi')| = \frac{1}{N}\left|\sum_{n=0}^{N/2-1} x(0,2n)\exp(j\gamma 2n) + x(0,2n+1)\exp(j\gamma(2n+1))\right| \qquad (34)$$

$$= \frac{1}{N}\left|\sum_{n=0}^{N/2-1} \exp(j\gamma 2n)[x(0,2n) + x(0,2n+1)\exp(j\gamma)]\right|$$

Assuming that $\gamma \ll 1$, where this is a less strict assumption than that used in equation (32), $x(0,2n) + x(0,2n+1)\exp(j\gamma) \approx x(0,2n) + x(0,2n+1)$, which is set to 0. Thus, the Condition B, which also satisfies the Condition A, is defined as follows:

$$x(0,2n) = -x(0,2n+1), n=0,\ldots,N/2-1 \qquad (35)$$

If the Condition B is satisfied, $$\max_{\psi'}|\Psi''(N,\gamma,\psi')| = \frac{1}{N}|(1-\exp(j\gamma))|\left|\sum_{n=0}^{N/2-1} \exp(j\gamma 2n)x(0,2n)\right| \qquad (36)$$

D. Condition C

From equation (34) the procedure can be repeated $N'=\log_2 N$, where $N'$ is a positive integer, times on equation (36) to obtain the following expression, $$\max_{\psi'}|\Psi''(N,\gamma,\psi')| = \frac{1}{N}|x(0,0)|\left|\prod_{n=0}^{N'-1}(1-\exp(j\gamma 2^n))\right| \qquad (37)$$

The bounds of equation (37) are obtained by subjecting the preamble to a set of conditions, which collectively is known as the Condition C, and defined as:

$$\begin{cases} x(0,2n) = -x(0,2n+1), & n=0,\cdots N/2-1 \\ x(0,4n) = -x(0,2(2n+1)), & n=0,\cdots N/4-1 \\ x(0,8n) = -x(0,4(2n+1)), & n=0,\cdots N/8-1 \\ \vdots \\ x(0,(N/2)n) = -x(0,(N/4)(2n+1)), & n=0,\cdots N/(N/2)-1 \\ x(0,0) = -x(0,N/2) \end{cases} \qquad (38)$$

To obtain the preamble which follows the Condition C, the following method is proposed: for N=2, the preamble, which is represented as a row vector, is $x_2 = x(0,0)[1,-1]$, for N=4 the preamble is $x_4 = [x_2, -x_2]$; and in general, the preamble is $x_N = [x_{N/2}, -x_{N/2}]$. Thus, the preamble is properly defined by specifying one of the preamble elements, say $x(0,0)$. For reference, for N=16, the preamble is $x(0,0) \cdot [1,-1,1,1,-1,1,1,-1,-1,1,1,-1,1,-1,-1,1]$. For simulation $x(0,0)$ is set to equal 1. It should be noted that, $$\prod_{n=0}^{N'-1}(1-\exp(j\gamma 2^n)) = \prod_{n=0}^{N'-1}(j\gamma 2^n - (\gamma 2^n)^2/2 + \cdots)$$

with the lowest order term given as, $$(j\gamma)^{N'} \cdot 2^{\sum_{n=0}^{N'-1} n} = \left(j\gamma \cdot 2^{(N'-1)/2}\right)^{N'} = \left(j\gamma\sqrt{N/2}\right)^{N'}$$

Thus, assuming that $\gamma < \sqrt{2/N}$, the lowest order term decreases at a rate of $N'$ and makes $\Psi''(N,\gamma,\psi')$ very close to 0, regardless of the value of $\psi$. The assumption $\gamma < \sqrt{2/N}$ appears to be less stringent than that required for the Condition B, which assumes that $\gamma \ll 1$.

Hence, in view of the analysis above, the assumption that $\Psi(M,N,\gamma) \ll 1$, and can therefore be ignored in equation (20) is valid.

First Embodiment of a Frequency Offset Estimator

Based on the assumption that $\Psi(M,N,\gamma)$ can be ignored, equation (20) can be simplified so that the frequency offset estimate $\hat{\gamma}$ is given by, $$\hat{\gamma} = \gamma - \frac{1}{N}\arg\left[1 + |\delta|^2 \exp(jN\gamma)\right] \qquad (39)$$

An approximated form of equation (39) is derived as follows:

$$\hat{\gamma} = \gamma - \frac{1}{N}\arg\left[1 + |\delta|^2\cos(N\gamma) + j|\delta|^2\sin(N\gamma)\right] \qquad (40)$$

$$\approx \gamma - \frac{1}{N}\arg\left[1 + |\delta|^2 + j|\delta|^2 N\gamma\right]$$

$$= \gamma - \frac{1}{N}\tan^{-1}\left(\frac{|\delta|^2 N\gamma}{1+|\delta|^2}\right)$$

$$\approx \gamma - \frac{1}{N}\left(\frac{|\delta|^2 N\gamma}{1+|\delta|^2}\right) = \gamma(1+|\delta|^2)^{-1}.$$

In the first approximation it is assumed that $N\gamma$ is small, so that $\cos(N\gamma) \approx 1$ and $\sin(N\gamma) \approx N\gamma$, and in the second approximation it is assumed that $$\frac{|\delta|^2 N\gamma}{1+|\delta|^2} \ll 1 \quad \text{i.e.} \quad N\gamma \ll 1+1/|\delta|^2,$$

such that $$\tan^{-1}\left[\frac{|\delta|^2 N\gamma}{1+|\delta|^2}\right] \approx \frac{|\delta|^2 N\gamma}{1+|\delta|^2}.$$

Note that the approximation is exact when $|\delta|^2=1$, which results in the estimation being more accurate in the region when $|\delta|^2=1$, and the simulation results bear this out.

In practice the frequency offset estimate $\hat{\gamma}$ is estimated from the phase $R_{zz}$. Thus, the frequency offset estimate for this embodiment, which will be referred to as FOEI, is defined as follows:

$$\tilde{\gamma}I \triangleq -\frac{1}{N}\arg(R_{zz})(1+|\delta|^2) \qquad (41)$$

Figure 13:
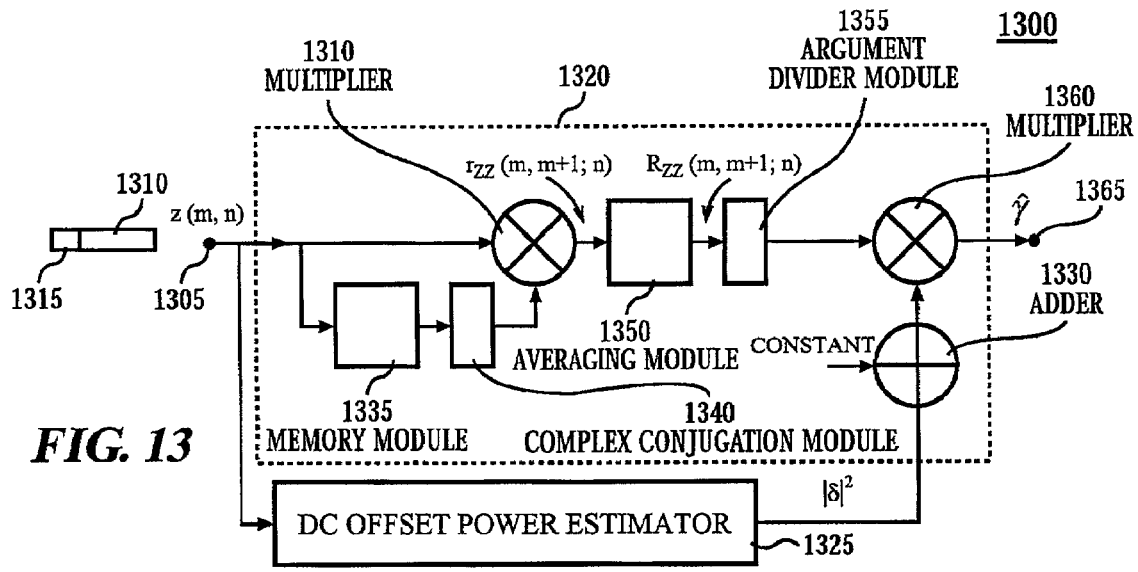
FIG. 13 shows a functional block diagram of a first embodiment of a frequency offset estimator in accordance with the present invention.
Figure 14:
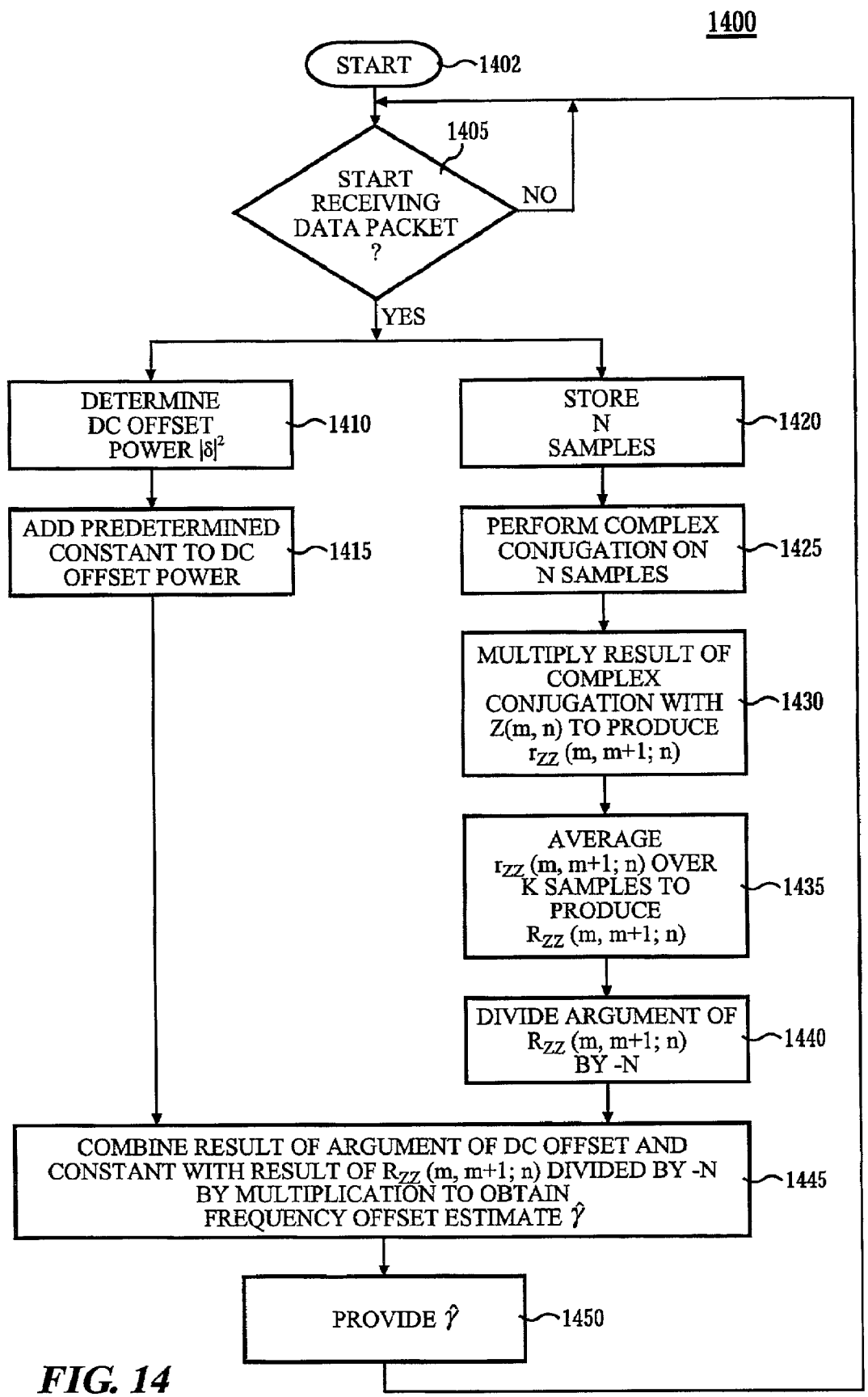
FIG. 14 is a flowchart detailing the operation of the frequency offset estimator in FIG. 13.

With reference to FIGS. 13 and 14 a frequency offset estimator 1300 and its operation 1400 starts 1402 with determining 1405 whether receipt of a data packet 1310 at an input 1305 has started. The data packet 1310 has a preamble 1315, which is represented by samples z(m,n). The input 1305 is coupled to a frequency offset estimator module 1320 and to a DC offset estimator 1325, both of which receive the preamble 1315. The DC offset estimator 1325 processes the preamble to determine 1410 and produce an estimate of DC offset power, that is represented by $|\delta|^2$. Subsequently, an adder 1330 adds 1415 a predetermined constant to the DC offset power $|\delta|^2$. In the frequency offset estimator module 1320, a memory module 1335 stores 1420 a predetermined number of the samples, represented by N, and the N samples are then processed by a complex conjugation module 1340, that performs 1425 complex conjugation on the N samples. The result from the complex conjugation module 1340 and the preamble z(m,n) 1315, are then multiplied 1430 together by a multiplier 1345 to produce an output, represented by $r_{zz}(m,m+1;n)$. An averaging module 1350 averages 1435 $r_{zz}(m,m+1;n)$ over a predetermined number of samples, K, and the averaging module 1350 provides an output represented by $R_{zz}(m,m+1;n)$. An argument divider 1355 then determines the argument of $R_{zz}(m,m+1;n)$, and divides 1440 it by $-N$ to produce a resulting quotient. The output of the argument divider 1350 i.e. the resulting quotient, and the output of the adder 1330 are then multiplied 1445 together by multiplier 1360, and the multiplier 1360 then provides 1450 a frequency offset estimate $\hat{\gamma}$ to an output 1365. The operation 1400 then returns to determining receipt of another data packet, and repeats as described.

Second Embodiment of a Frequency Offset Estimator

Again assuming that $\Psi(M,N,\gamma)$ can be ignored, equation (17) can be rewritten, as follows:

$$R_{yy}(m,m+1;n) \approx \exp(-jN\gamma)+|\delta|^2 \qquad (42)$$

This is estimated from $R_{zz}(m,m+1;n)$, thus where implementation allows $|\delta|^2$ to be removed from $R_{zz}$ first before calculating the phase, then the frequency offset for this embodiment, which will be referred to as FOEII, is defined as follows:

$$\tilde{\gamma}II \triangleq -\frac{1}{N}\arg(R_{zz}-|\delta|^2) \qquad (43)$$

Figure 15:
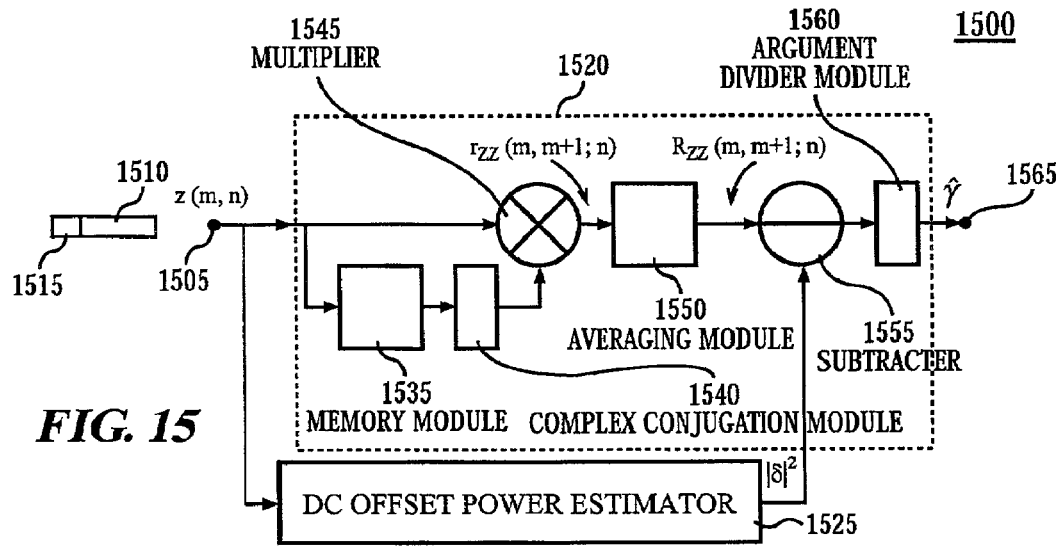
FIG. 15 shows a functional block diagram of a second embodiment of a frequency offset estimator in accordance with the present invention.
Figure 16:
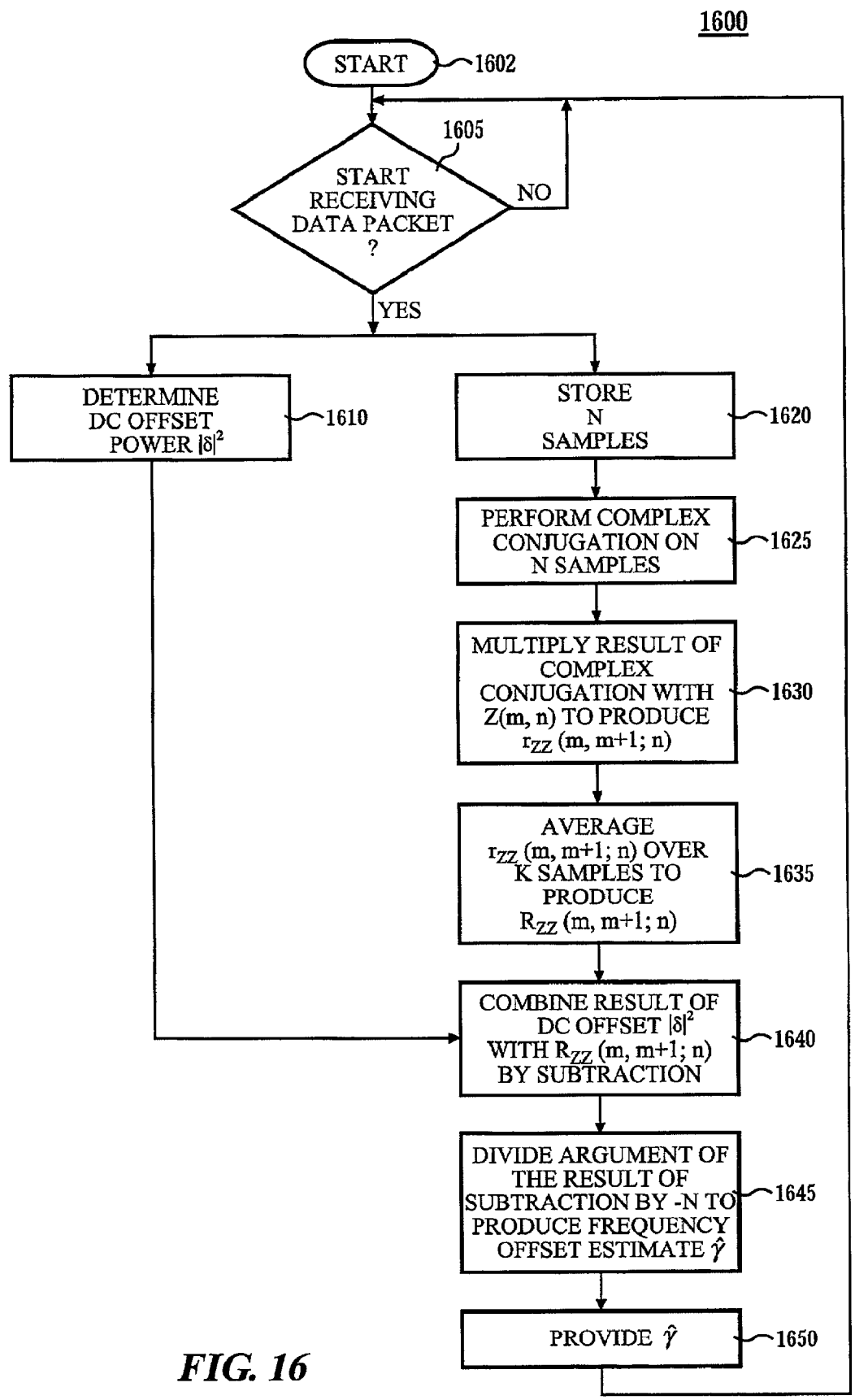
FIG. 16 is a flowchart detailing the operation of the frequency offset estimator in FIG. 15.

With reference to FIGS. 15 and 16 a frequency offset estimator 1500 and its operation 1600 starts 1602 with determining 1605 whether receipt of a data packet 1510 at an input 1505 has started. The data packet 1510 has a preamble 1515, which is represented by samples z(m,n). The input 1505 is coupled to a frequency offset estimator module 1520 and to a DC offset estimator 1525, both of which receive the preamble 1515. The DC offset estimator 1525 processes the preamble to determine 1610 and produce an estimate of DC offset power, that is represented by $|\delta|^2$. In the frequency offset estimator module 1520, a memory module 1535 stores 1620 a predetermined number of the samples, represented by N, and the N samples are then processed by a complex conjugation module 1540, that performs 1625 complex conjugation on the N samples.

The result from the complex conjugation module 1540 and the preamble z(m,n) 1515, are then multiplied 1630 together by a multiplier 1545 to produce an output, represented by $r_{zz}(m,m+1;n)$. An averaging module 1550 averages 1635 $r_{zz}(m,m+1;n)$ over a predetermined number of samples, K, and the averaging module 1550 provides an output represented by $R_{zz}(m,m+1;n)$.

A subtractor 1555 combines the output $R_{zz}(m,m+1;n)$ from the averaging module 1550 and the output $|\delta|^2$ from the DC offset estimator 1525, and an argument divider module 1560 then determines the argument of the result from the subtractor 1555, and divides 1645 the argument by $-N$ to produce the frequency offset estimate $\hat{\gamma}$. The argument divider module 1565 then provides 1650 the frequency offset estimate $\hat{\gamma}$ to an output 1565.

The present invention, as described in the embodiments herein, advantageously provide a frequency offset estimator that takes into account an estimate of DC offset, and produces an improved frequency offset estimate.

Using computer simulations with the number of discrete points in one preamble slot N=16, for different SNR and $\epsilon$, MSE is calculated and plotted for 1000 simulations against increasing DC offset power $|\delta|^2$, to produce a series of graphs.

Figure 17A:
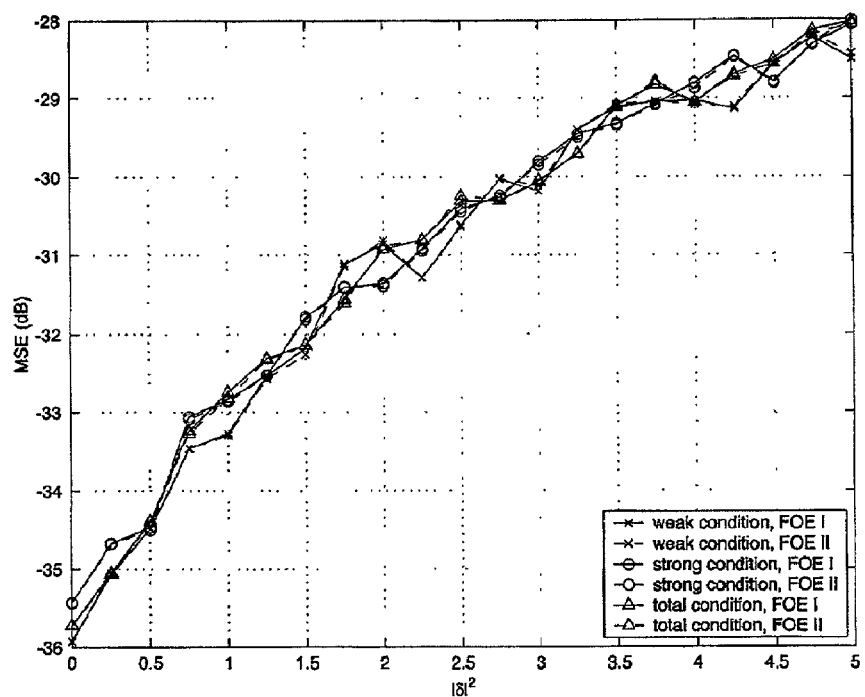
FIGS. 17A–F provide graphs showing the performance of the first and second embodiments of the present invention based on the preamble of a smaller number of data packets.
Figure 17B:
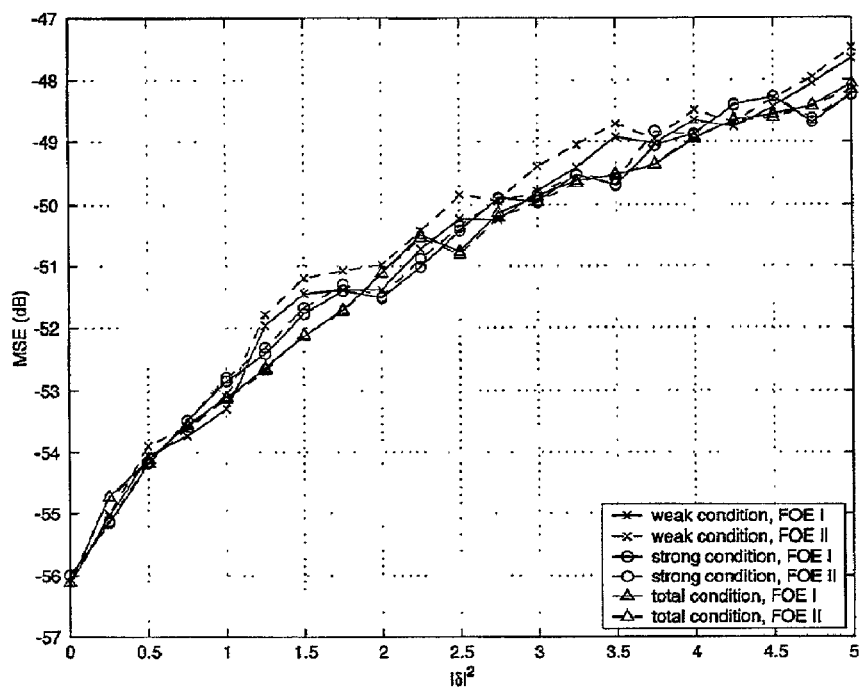
Figure 17C:
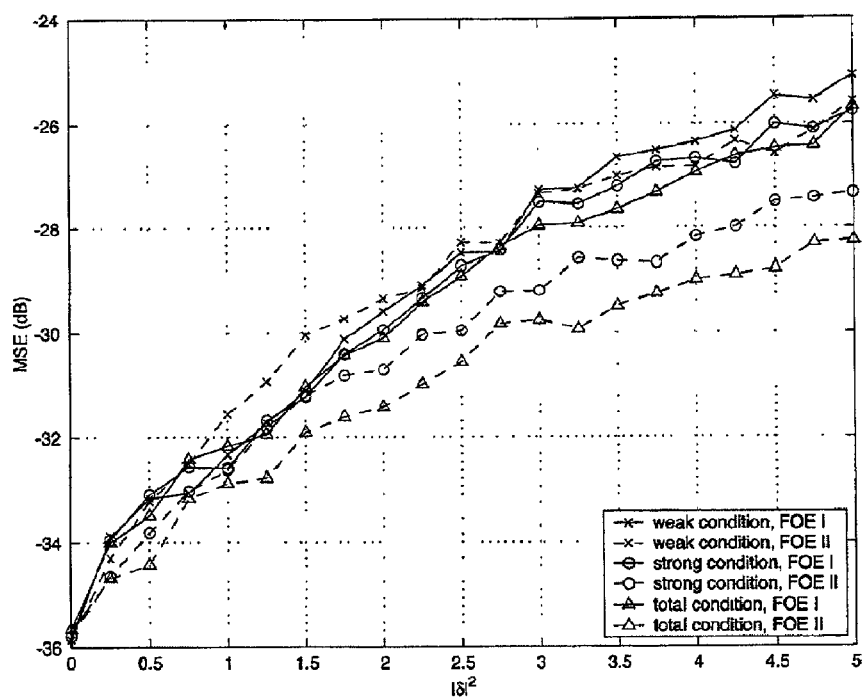
Figure 17D:
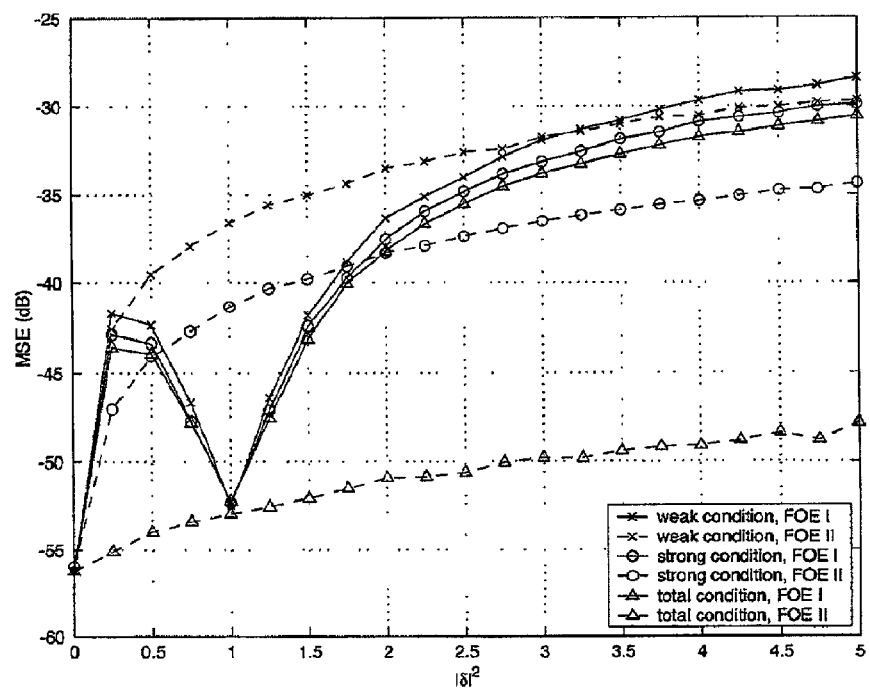
Figure 17E:
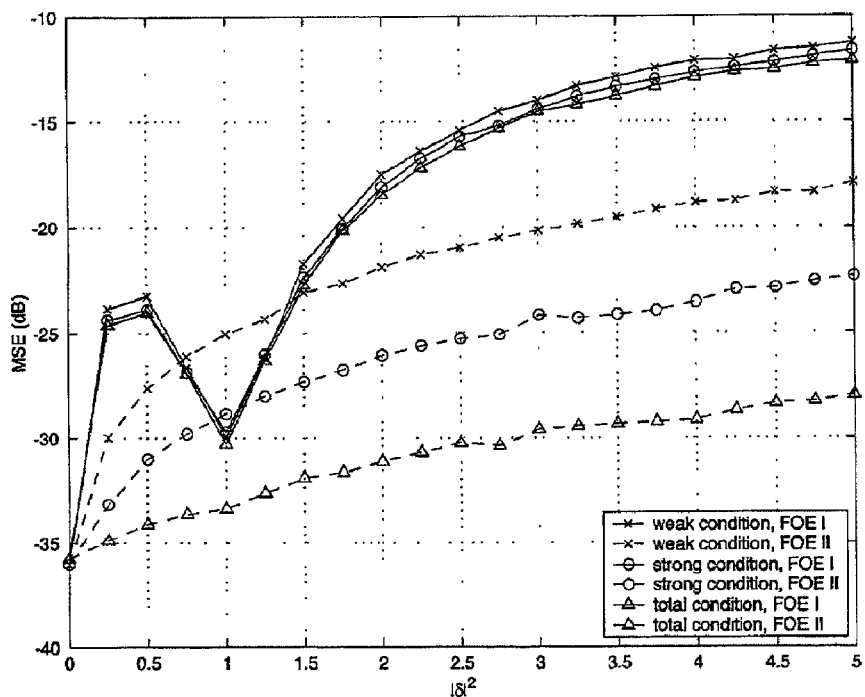
Figure 17F:
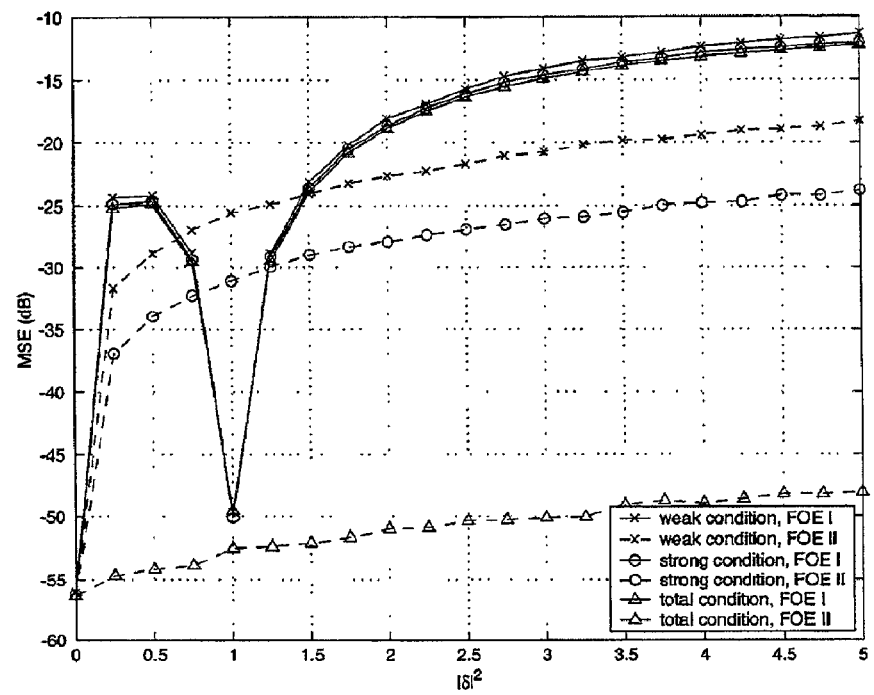

With reference to FIGS. 17A–F the graphs show resultant MSE for both FOEI and FOEII across increasing DC offset power $|\delta|^2$, for the three preamble conditions i.e. Condition A, Condition B and Condition C, when two preamble slots are used i.e. M=2. The relative frequency offset is $\epsilon=0.1$ for FIGS. 17A and 17B; is $\epsilon=0.5$ for FIGS. 17C and 17D; and is $\epsilon=1$ for FIGS. 17E and 17F. The SNR for the graphs in FIGS. 17A, 17C and 17E is 20dB and can be compared with stronger signal conditions in FIGS. 17B, 17D and 17F, where the SNR is 40 dB.

Similarly, with reference to FIGS. 18A–F the graphs show resultant MSE for both FOEI and FOEII across increasing DC offset power $|\delta|^2$, for the three preamble conditions i.e. Condition A, Condition B and Condition C, when four preamble slots are used i.e. M=4. The relative frequency offset is $\epsilon=0.1$ for FIGS. 18A and 18B; is $\epsilon=0.5$ for FIGS.

Figure 18A:
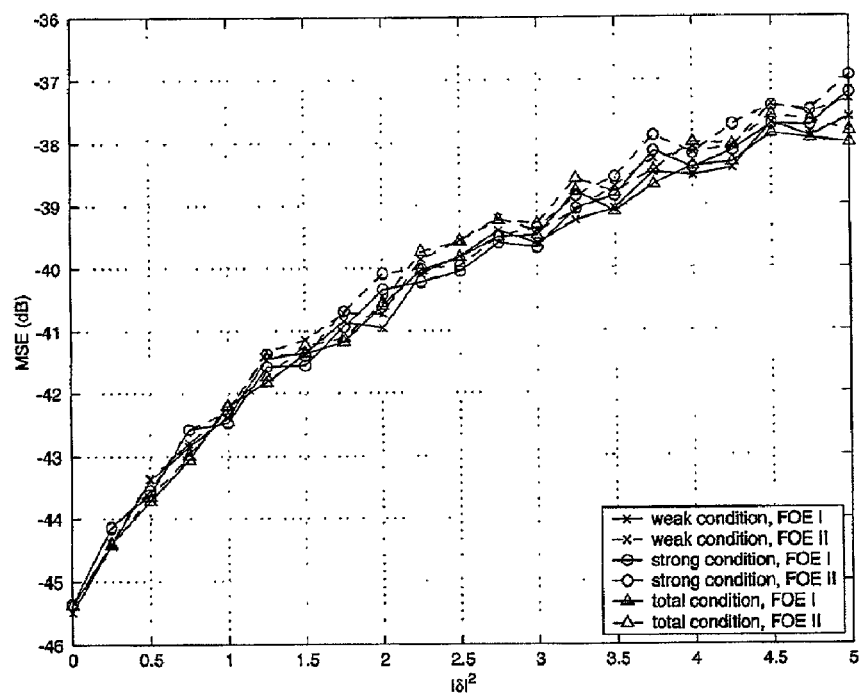
FIGS. 18A–F provide graphs showing the performance of the first and second embodiments of the present invention based on the preamble of a larger number of data packets.
Figure 18B:
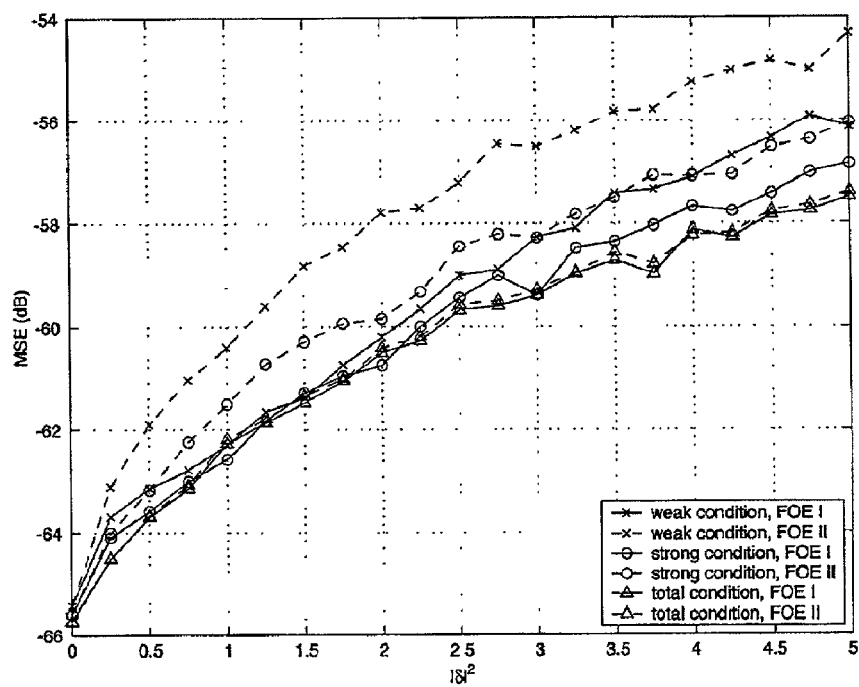
Figure 18C:
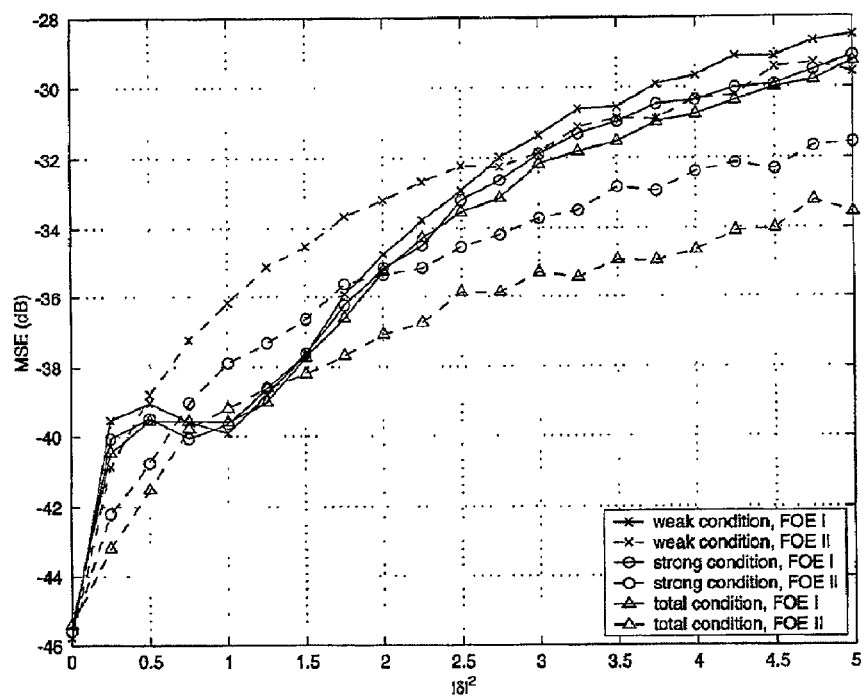
Figure 18D:
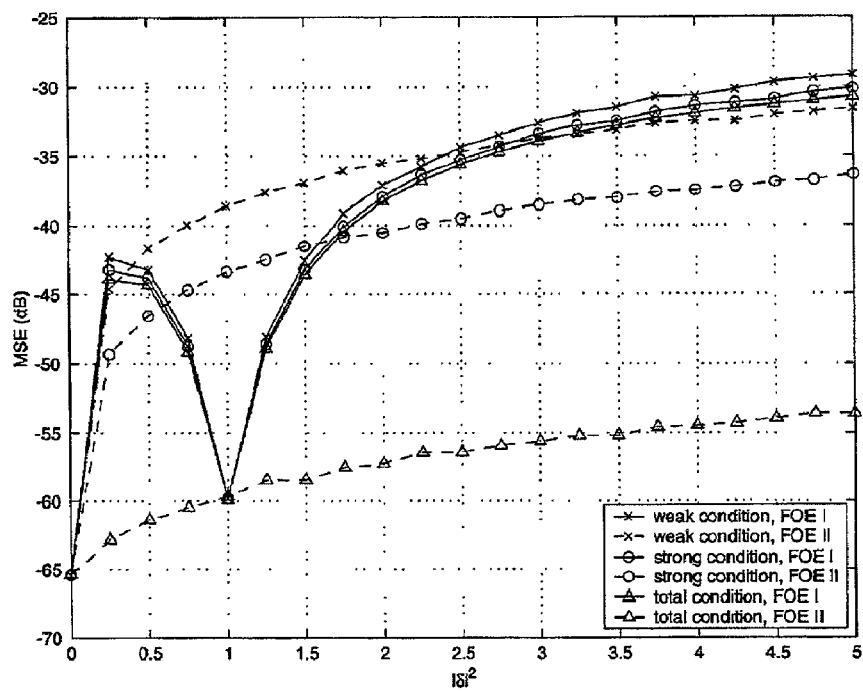
Figure 18E:
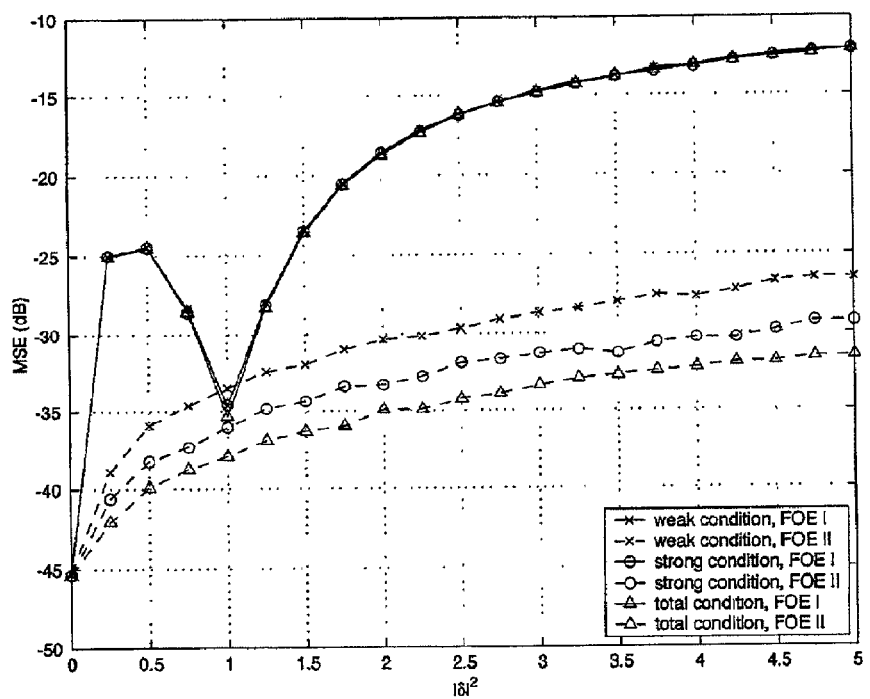
Figure 18F:
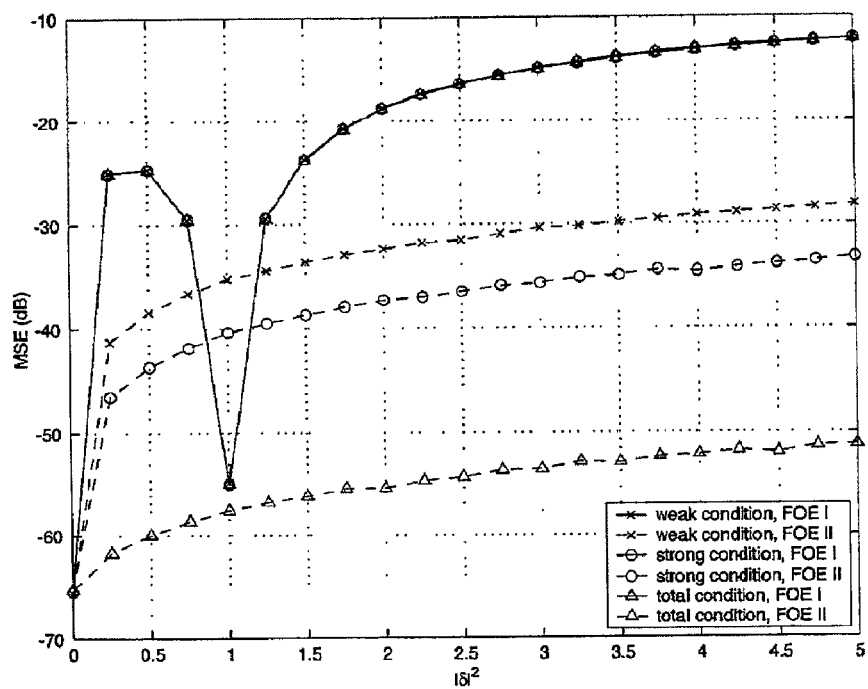

18C and 18D; and is ε=1 for FIGS. 18E and 18F. The SNR for the graphs in FIGS. 18A, 18C and 18E is 20 dB and can be compared with stronger signal conditions in FIGS. 18B, 18D and 18F, where the SNR is 40 dB.

The FIGS. 17A–F and 18A–F, show that preambles that satisfy the Condition A, Condition B and Condition C advantageously result in decreasing MSE for both FOEI and FOEII. The decrease is more significant for FOEII than FOEI, particularly at higher SNR values.

Figure 19A:
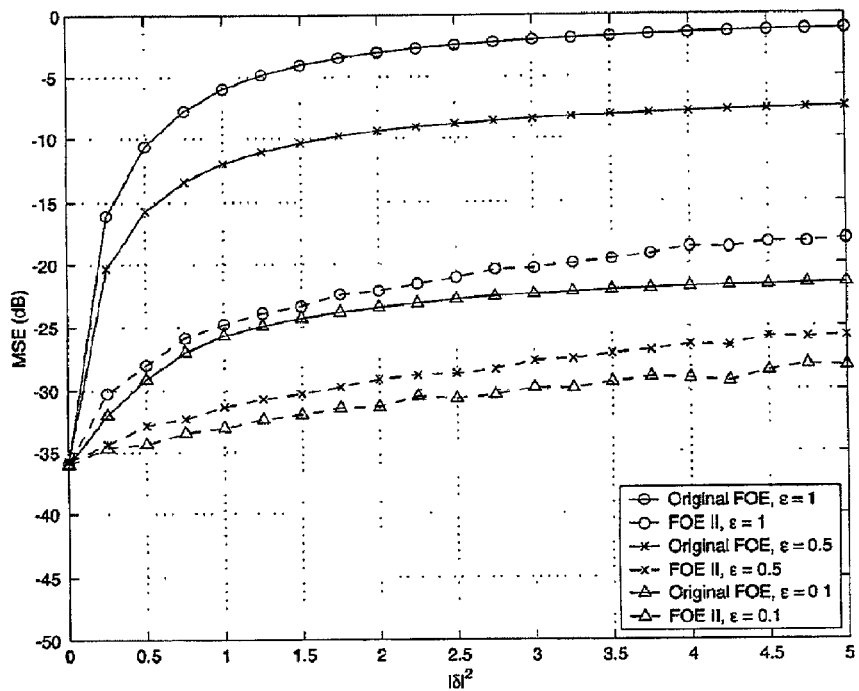
FIGS. 19A–C provide graphs comparing the performance of the second embodiment of the present invention to a prior art frequency offset estimator.
Figure 19B:
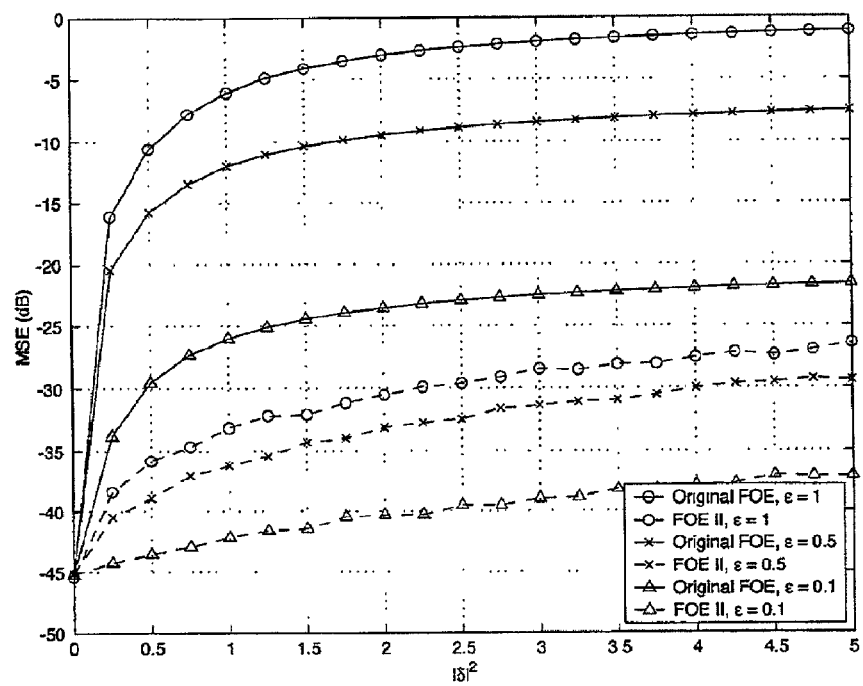
Figure 19C:
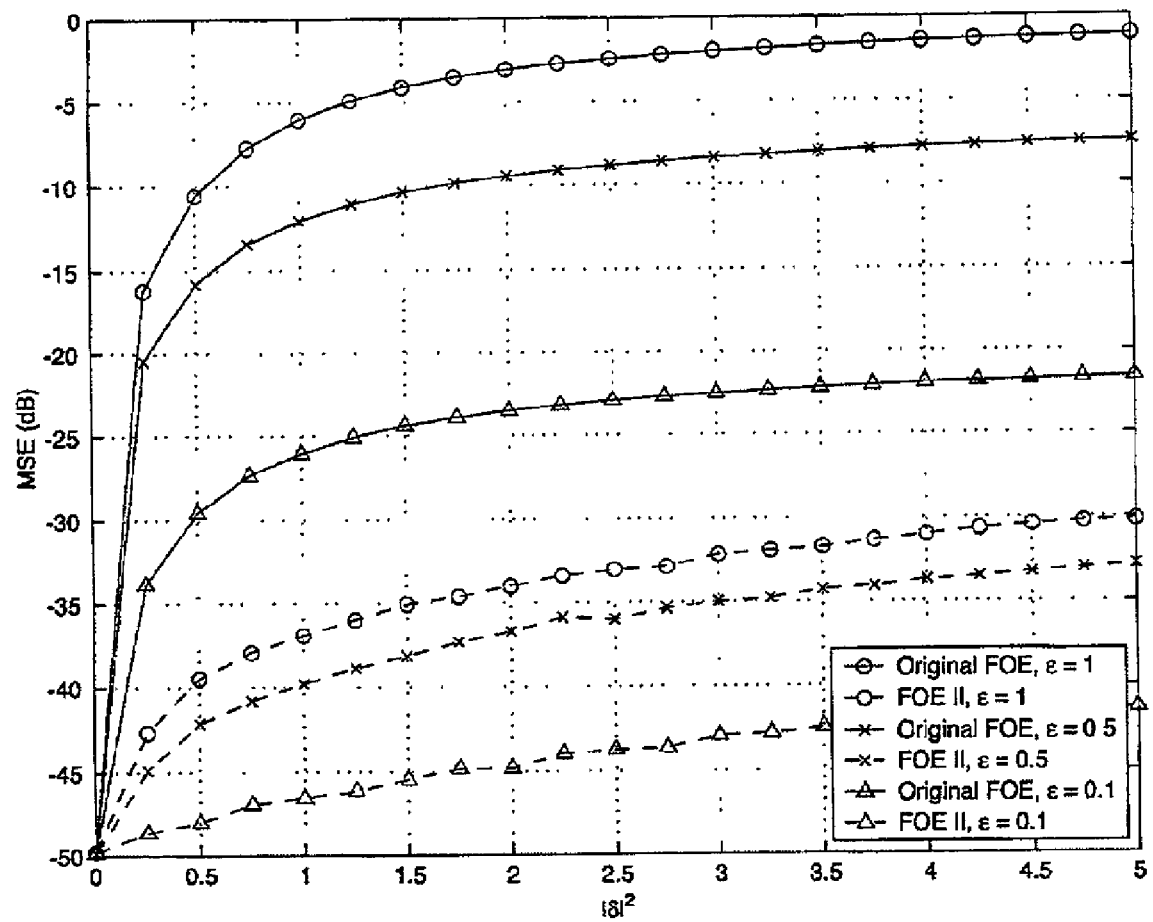

With reference to FIGS. 19A–19C, the graphs show plots for a prior art FOE, referred to in the graphs as original FOE, and FOEII in accordance with the present invention, as described. Again using computer simulations with the number of discrete points in one preamble slot N=16 at SNR=20 dB for different ε, MSE is calculated and plotted for 1000 simulations against increasing DC offset power $|\delta|^2$, to produce a series of graphs for M=2, 4 and 6.

The FOE of the present invention as described, advantageously provides substantially improved performance relative to the prior art FOE, particularly in the increasing presence of DC offset.

This is accomplished by a frequency offset estimator that takes into account DC offset in determining a frequency offset estimate. The frequency offset estimator can then be used with a DC offset estimator, that provides the DC offset estimate, and with a compensator, to provide a frequency offset estimation and compensation system.

The frequency offset compensator advantageously receives the estimate of the DC offset from the DC estimator and uses the estimate of the DC offset to produce the estimate of the frequency offset, thus providing an improved estimate of the frequency offset.

As the DC offset estimator and the frequency offset estimator operate concurrently to produce estimates of DC and frequency offsets from the preamble of received data packets, the concurrent operation advantageously allows more time for both the DC offset estimator and the frequency offset estimator to produce the estimates of DC and frequency offsets.

Thus, the present invention, as described provides a method and apparatus for frequency offset estimation, and system utilizing same, which overcomes or at least reduces the abovementioned problems of the prior art.

It will be appreciated that although only particular embodiments of the invention have been described in detail, various modifications and improvements can be made by a person skilled in the art without departing from the scope of the present invention.

We claim:

1. A data communication receiver for receiving at least one data packet, wherein the at least one data packet has a variety of inherent offsets, the data communication receiver comprising:

an input coupled to receive the at least one data packet; and a plurality of offset estimators coupled to the input, the plurality of offset estimators comprising:

at least one of the plurality of offset estimators for estimating at least one of the variety of inherent offsets from at least a received portion of the at least one data packet while the at least one data packet is being received, and the at least one of the plurality of offset estimators having an output for providing an estimate of the at least one of the variety of inherent offsets, wherein the at least one of the plurality of offset estimators comprises a direct current offset estimator, the direct current offset estimator for estimating a direct current offset from the at least the received portion of the at least one data packet while the at least one data packet is being received, and the direct current offset estimator for providing an estimate of the direct current offset of the at least one data packet; and at least another one of the plurality of offset estimators coupled to the output of the at least one of the plurality of offset estimators, the at least another one of the plurality of offset estimators for estimating at least another one of the variety of inherent offsets from the at least the received portion of the at least one data packet while the at least one data packet is being received and from the estimate of the at least one of the variety of inherent offsets, and the at least another one of the plurality of offset estimators having an output for providing an estimate of the at least another one of the variety of inherent offset;

wherein the at least another one of the plurality of offset estimators comprises a frequency offset estimator coupled to receive the estimate of the direct current offset of the at least one data packet from the direct current offset estimator, the frecuency offset estimator for estimating a frequency offset from the at least the received portion of the at least one data packet while the at least one data packet is being received and from the estimate of the direct current offset of the at least one data packet, and the frequency offset estimator for providing an estimate of the frequency offset of the at least one data packet.

2. A data communicauon receiver in accordance with claim 1 further compnsing a compensator, wherein the compensator is coupled to the input for receiving the at least one data packet, coupled to the output of the at least one of the plurality of offset estimators for receiving the estimate of the at least one of the variety of inherent offsets, and coupled to the output of the at least another one of the plurality of offset estimators for receiving the estimate of the at least another one of the variety of inherent offsets, the compensator for compensating the at least one of the variety of inherent offsets of the data packet using the estimate of the at least one of the variety of inherent offsets, the compensator for compensating the at least another one of the variety of inherent offsets of the data packet using the estimate of the at least another one of the variety of inherent offsets, and the compensator for producing a compensated data packet; and an output coupled to the compensator for providing the compensated data packet corresponding to the at least one data packet.

3. A data cornxnunicazion receiver in accordance with claim 1 wherein the frequency offset estimator comprises:

an input for receiving samples of the at least one data packet;

a memory module coupled to the input, the memory module for storing a predetermined number of the samples of at least an initial portion of the at least one data packet, and the memory module for providing at least the stored samples;

a complex conjugation module coupled to receive the stored samples, the complex conjugation module for determining complex conjugation of the stored samples, and for providing complex conjugated samples;

a multiplier coupled to the input and coupled to the complex conjugation module, the multiplier for multiplying the samples of the at least one data packet and the complex conjugated samples to produce multiplied samples;

an averaging module coupled to receive the multiplied samples, the averaging module for averaging the multiplied samples by another predetermined number, and for providing averaged samples;

an argument divider module coupled to receive the averaged samples, the argument divider for determining the argument of the averaged samples, for dividing the argument by the predetermined number, and for providing the quotient;

an adder coupled to receive the estimate of the direct current offset of the at least one data packet, the adder for adding a predetermined constant to the estimate of the direct current offset, and the adder for producing added direct current offset;

another multiplier coupled to the adder and the argument divider module, the another multiplier for multiplying the added direct current offset and the quotient to produce the estimate of the frequency offset of the at least one data packet; and an output coupled to the another multiplier for providing the estimate of the frequency offset of the at least one data packet.

4. A data communication receiver in accordance with claim 1 wherein the frequency offset estimator comprises:

an input for receiving samples of the at least one data packet;

a memory module coupled to the input, the memory module for storing a predetermined number of the samples of at least an initial portion of the at least one data packet, and the memory module for providing at least the stored samples;

a complex conjugation module coupled to receive the stored samples, the complex conjugation module for determining complex conjugation of the stored samples, and for providing complex conjugated samples;

a multiplier coupled to the input and coupled to the complex conjugation module, the multiplier for multiplying the samples of the at least one data packet and the complex conjugated samples to produce multiplied samples;

an averaging module coupled to receive the multiplied samples, the averaging module for averaging the multiplied samples by another predetermined number, and for providing averaged samples;

a subtrator coupled to the averaging module and the direct current offset estimator for combining the averaged samples and the estimate of the direct current offset of the at least one data packet, and the subtractor for producing a subtracted result;

an argument divider module coupled to receive the subtracted result, the argument divider module for determining the argument of the subtracted result, and for dividing the argument by the predetermined number to produce the estimate of the frequency offset of the at least one data packet; and an output coupled to the argument divider module for providing the estimate of the frequency offset of the at least one data packet.

5. A data communication receiver for receiving data packets, the data communication receiver comprising:

an input coupled to receive at least one data packet, wherein the at least one data packet has a variety of inherent offsets;

at least one offset estimator for estimating at least one of the variety of inherent offsets from at least a received portion of the at least one data packet while the at least one data packet is being received, and the at least one offset estimator having an output for providing an estimate of the at least one of the variety of inherent offsets;

at least one compensator coupled to the input for receiving the at least one data packet, and coupled to the output of the at least one offset estimator for receiving the estimate of the at least one of the variety of inherent offsets, the at least one compensator for compensating the at least one of the variety of inherent offsets of the data packet using the estimate of the at least one of the variety of inherent offsets to produce at least a portion of a partially compensated data packet, and wherein the at least one compensator has an output for providing the at least the portion of the partially compensated data packet corresponding to the at least one data packet, wherein the at least one compensator comprises at least one direct current offset compensator, the at least one direct current offset compensator for receiving the estimate of the direct current offset of the at least one data packet, the at least one direct current offset compensator for compensating the direct current offset of the at least one data packet using the estimate of the direct current offset of the at least one data packet, and the at least one direct current compensator for producing at least a portion of a partially direct current compensated data packet;

a plurality of offset estimators coupled to the output of the at least one compensator, the plurality of offset estimators comprising:

at least one of the plurality of offset estimators for estimating the at least one of the variety of inherent offsets front the at least the portion of the partially compensated data packet while the in least the portion of the partially compensated data packet is being received, and the at least one of the plurality of offset estimators having an output for providing an estimate of the at least one of the variety of inherent offsets, wherein the at least one of the plurality of offset estimators comprises at least another direct current estimator, the at least another direct current estimator for estimating direct current offset from the at least the portion of the partially direct current compensated data packet while the at least the portion of the partially direct current compensated data packet is being received, and for providing an estimate of direct current offset of the partially direct current compensated data packet; and at least another one of the plurality of offset estimators coupled to the output of the at least one of the plurality of offset estimators, the at least another one of the plurality of offset estimators for estimating at least another one of the variety of inherent offsets from the at least the portion of the partially compensated data packet while the at least the portion of the partially compensated data packet is being received, and from the estimate of the at least one of the variety of inherent offsets, and the at least another one of the plurality of offset estimators having an output for providing an estimate of the at least another one of the variety of inherent offsets.

6. A data communication receiver in accordance with claim 5 further comprises another compensator, wherein the another compensator is coupled to the output of the at least one compensator, the another compensator for receiving the at least the portion of the partially compensated data packet, the another compensator coupled to the output of the at least one of the plurality of offset estimators for receiving the estimate of the at least one of the variety of inherent offsets, and coupled to the output of the at least another one of the plurality of offset estimators for receiving the estimate of the at least another one of the variety of inherent offsets, the another compensator for compensating the at least one of the variety of inherent offsets of the data packet using the estimate of the at least one of the variety of inherent offsets, and for compensating the at least another one of the variety of inherent offsets of the data packet using the estimate of the at least another one of the variety of inherent offsets, to produce a further compensated data packet; and an output coupled to the another compensator for providing the further compensated data packet corresponding to the at least one data packet.

7. A data communication receiver in accordance with claim 5 wherein the at least one offset estimator comprises at least one direct current offset estimator, the at least one direct current offset estimator for estimating a direct current offset from the at least the received portion of the at least one data packet while the at least one data packet is being received, and the at least one direct current offset estimator for providing an estimate of the direct current offset of the at least one data packet.

8. A data communication receiver in accordance with claim 5 wherein the at least another one of the plurality of offset estimators comprises at least one frequency offset estimator, the at least one frequency offset estimator coupled to the output of the at least another direct current estimator, the at least one frequency offset estimator for estimating frequency offset from the at least the portion of the partially direct current compensated data packet while the at least the portion of the partially direct current compensated data packet is being received, and the at least one frequency offset estimator for providing an estimate of the frequency offset of the partially direct current compensated data packet.

9. A data communication receiver in accordance with claim 8 wherein the another compensator comprises at least one direct current and frequency offset compensator, the at least one direct current and frequency offset compensator for receiving the estimate of the direct current offset of the partially direct current compensated data packet and the estimate of the frequency offset of the partially direct current compensated data packet, for compensating the at least the portion of the partially direct current compensated data packet using the estimate of the direct current offset of the partially direct current compensated data packet and the estimate of the frequency offset of the partially direct current compensated data packet, and for producing the further compensated data packet corresponding to the at least one data packet.

10. A frequency offset estimator comprising:

an input for receiving at least one data packet, wherein the data packet has at least a direct current offset and a frequency offset, the input receives samples of the at least one data packet;

a memory module coupled to the input, the memory module for storing a predetermined number of the samples of at least an initial portion of the at least one data packet, and the memory module for providing at least the stored samples;

a complex conjugation module coupled to receive the stored samples, the complex conjugation module for determining complex conjugation of the stored samples, and for providing complex conjugated samples;

a multiplier coupled to the input and coupled to the complex conjugation module, the multiplier for multiplying the samples of the at least one data packet and the complex conjugated samples to produce multiplied samples;

an averaging module coupled to receive the multiplied samples, the averaging modules for averaging the multiplied samples by another predetermined numbers, and for providing averaged samples;

an input for receiving an estimate of the direct current offset; and an output for providing an estimate of the frequency offset.

11. A frequency offset estimator in accordance with claim 10 further comprising:

an argument divider module coupled to receive the averaged samples, the argument divider for determining the argument of the averaged samples, for dividing the argument by the negative value of the predetermined number, and for providing the quotient;

an adder coupled to receive the estimate of the direct current offset of the at least one data packet, the adder for adding a predetermined constant to the estimate of the direct current offset, and the adder for producing added direct current offset;

another multiplier coupled to the adder and the argument divider module, the another multiplier for multiplying the added direct current offset and the quotient to produce the estimate of the frequency offset of the at least one data packet; and the output coupled to the another multiplier for providing the estimate of the frequency offset of the at least one data packet.

12. A frequency offset estimator in accordance with claim 10 further comprising:

a subtractor coupled to the averaging module and the direct current offset estimator for combining the averaged samples and the estimate of the direct current offset of the at least one data packet, and the subtractor for producing a subtracted result;

an argument divider module coupled to receive the subtracted result, the argument divider module for determining the argument of the subtracted result, and for dividing the argument by the negative value of the predetermined number to produce the estimate of the frequency offset of the at least one data packet; and the output coupled to the argument divider module for providing the estimate of the frequency offset of the at least one data packet.

13. A method for offset compensation comprising the steps of:

a) determining at least one data packet is being received;

b) estimating direct current offset of the at least one data packet to produce an estimate of direct current offset;

c) estimating frequency offset of the at least one data packet using the estimate of direct current offset;

d) compensating the at least one data packet using the estimate of direct current offset and an estimate of frequency offset to produce a compensated data packet;

e) providing the compensated data packet corresponding to the at least one data packet.

14. A method in accordance with claim 13, further comprising performing steps (b) and (c) substantially concurrently while the at least one data packet is being received.

15. A method in accordance with claim 13, further comprising performing step (d) while the at least one data packet is being received.

16. A method in accordance with claim 13, further comprising performing step (d) after the at least one data packet has been received.

17. A method in accordance with claim 13, prior to step (a) comprising the steps of:
   determining at least another data packet corresponding to the at least one data packet is being received;
   estimating direct current offset of the at least another data packet to produce another estimate of direct current offset; and
   compensating the at least another data packet using the another estimate of direct current offset to produce the at least one data packet.

18. A method for frequency offset estimation comprising the steps of:
   a) determining samples of at least one data packet are being received;
   b) determining direct current offset power using the samples of the at least one data packet;
   c) adding a predetermined constant to the direct current offset power;
   d) storing a predetermined number of the samples of the at least one data packet;
   e) performing complex conjugation on the predetermined number of the samples to produce a result;
   f) multiply the result of the complex conjugation with the samples of the at least one data packet to produce an output;
   g) determine the average of the output from step (f) by another predetermined number to provide an average;
   h) determine argument of the avenge and divide the argument by the negative value of the predetermined number to produce a resulting quotient; and
   i) multiply the resulting quotient by the sum of the constant and the direct current offset power determined in step (c) to produce a frequency offset estimate.

19. A method for frequency offset estimation comprising the steps of:
   a) determining samples of at least one data packet are being received;
   b) determining direct current offset power using the samples of the at least one data packet;
   c) storing a predetermined number of the samples of the at least one data packet;
   d) performing complex conjugation on the predetermined number of the samples to produce a result;
   e) multiply the result of the complex conjugation with the samples of the at least one data packet to produce an output;
   f) determine the average of the output from step (e) by another predetermined number to provide an average;
   g) combine the direct current offset power from step (b) with the avenge from step (f) by subtraction;
   h) determine argument of the result of subtraction from step (g) and divide the argument by the negative value of the predetermined number to produce a frequency offset estimate.

* * * * *